(12) United States Patent
Kim et al.

(10) Patent No.: US 11,900,262 B2
(45) Date of Patent: Feb. 13, 2024

(54) NEURAL NETWORK DEVICE, NEURAL NETWORK SYSTEM, AND METHOD OF PROCESSING NEURAL NETWORK MODEL BY USING NEURAL NETWORK SYSTEM

(71) Applicant: SAMSUNG ELECTRONICS CO., LTD., Suwon-si (KR)

(72) Inventors: Kyoungyoung Kim, Suwon-si (KR); Sangsoo Ko, Yongin-si (KR); Doyun Kim, Gwacheon-si (KR); Sanghyuck Ha, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 416 days.

(21) Appl. No.: 16/738,038

(22) Filed: Jan. 9, 2020

(65) Prior Publication Data

US 2020/0234147 A1  Jul. 23, 2020

(30) Foreign Application Priority Data

Jan. 21, 2019 (KR) .................. 10-2019-0007583
Jul. 22, 2019 (KR) .................. 10-2019-0088529

(51) Int. Cl.
*G06N 3/10* (2006.01)

(52) U.S. Cl.
CPC ..................................... *G06N 3/10* (2013.01)

(58) Field of Classification Search
CPC ....... G06N 3/10; G06N 3/0445; G06N 3/0454
See application file for complete search history.

(56) References Cited

U.S. PATENT DOCUMENTS

| 9,202,144 B2 | 12/2015 | Wang et al. |
| 9,619,735 B1 | 4/2017 | Lineback et al. |
| 2016/0358069 A1 | 12/2016 | Brothers et al. |
| 2017/0243113 A1 | 8/2017 | Fukuda et al. |
| 2017/0337468 A1 | 11/2017 | Bruestle et al. |

(Continued)

FOREIGN PATENT DOCUMENTS

KR  10-2018-0101978 A  9/2018

OTHER PUBLICATIONS

Yufei Ma ("Hardware Acceleration of Deep Convolutional Neural Networks on FPGA", PhD Dissertation, Arizona State University, Dec. 2018, pp. 1-153) (Year: 2018).*

(Continued)

*Primary Examiner* — Miranda M Huang
*Assistant Examiner* — Robert Lewis Kulp
(74) *Attorney, Agent, or Firm* — Sughrue Mion, PLLC

(57) ABSTRACT

A neural network system for processing a neural network model including an operation processing graph that includes a plurality of operations, includes an operation processor including an internal memory storing a first module input feature map. The operation processor is configured to obtain a first branch output feature map by performing a first operation among the plurality of operations, based on the stored first module input feature map, and obtain a second branch output feature map by performing a second operation among the plurality of operations after the first operation is performed, based on the stored first module input feature map. The internal memory maintains storage of the first module input feature map while the first operation is performed.

19 Claims, 18 Drawing Sheets

(56) References Cited

U.S. PATENT DOCUMENTS

2017/0351936 A1    12/2017  Jiang
2018/0189613 A1    7/2018   Wolf et al.
2018/0253636 A1    9/2018   Lee et al.

OTHER PUBLICATIONS

Aimar et al. ("NullHop: A Flexible Convolutional Neural Network Accelerator Based on Sparse Representations of Feature Maps", https://arxiv.org/pdf/1706.01406.pdf, arXiv:1706.01406v2 [cs.CV], Mar. 6, 2018, pp. 1-13) (Year: 2018).*

Mingyu Gao ("Scalable Near-Data Processing Systems for Data-Intensive Applications", PhD Thesis, Stanford University, 2018, pp. 1-182) (Year: 2018).*

Stoutchinin et al. ("Optimally Scheduling CNN Convolutions for Efficient Memory Access", IEEE Transactions on Computer-Aided Design of Integrated Circuits and Systems, https://arxiv.org/pdf/1902.01492.pdf, arXiv:1902.01492v1 [cs.NE] Feb. 4, 2019, pp. 1-14) (Year: 2019).*

Wang et al. ("Towards Memory-Efficient Allocation of CNNs on Processing-in-Memory Architecture", IEEE Transactions on Parallel and Distributed Systems, vol. 29, No. 6, Jun. 2018, pp. 1428-1441) (Year: 2018).*

Gao et al. ("TETRIS: Scalable and Efficient Neural Network Acceleration with 3D Memory", ASPLOS'17, 2017, pp. 751-764) (Year: 2017).*

Aimar et al., "NullHop: A Flexible Convolutional Neural Network Accelerator Based on Sparse Representations of Feature Maps", Mar. 6, 2018, pp. 1-13, 13 pages total.

* cited by examiner

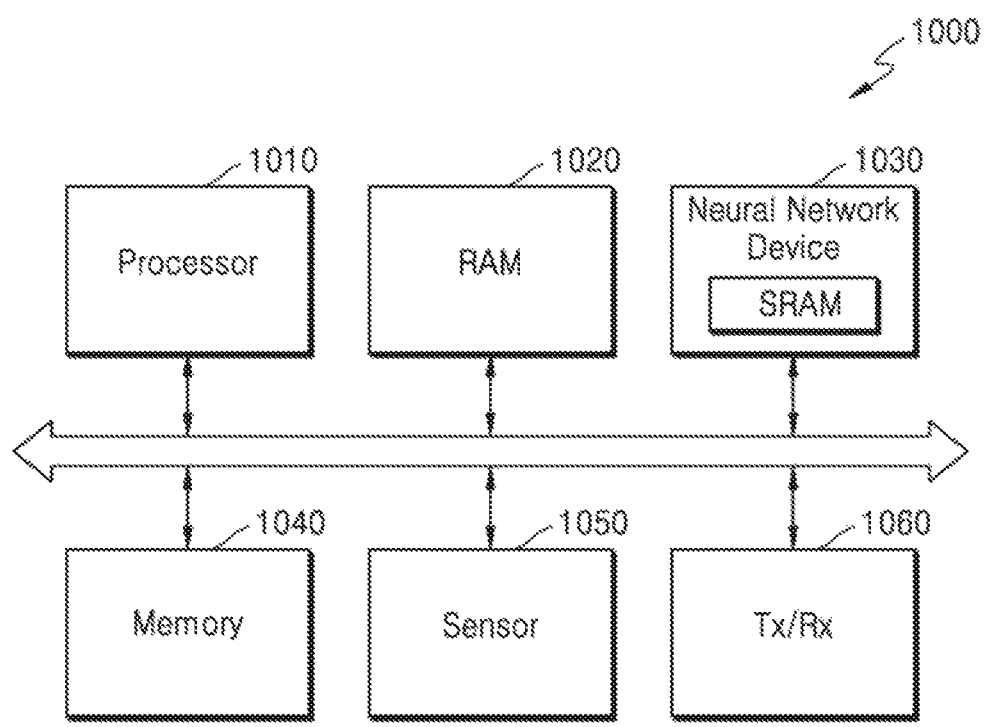

NEURAL NETWORK DEVICE, NEURAL NETWORK SYSTEM, AND METHOD OF PROCESSING NEURAL NETWORK MODEL BY USING NEURAL NETWORK SYSTEM

CROSS-REFERENCE TO THE RELATED APPLICATIONS

This application is based on and claims priority under 35 U.S.C. § 119 to Korean Patent Application No. 10-2019-0007583, filed on Jan. 21, 2019, and Korean Patent Application No. 10-2019-0088529, filed on Jul. 22, 2019, in the Korean Intellectual Property Office, the disclosures of which are incorporated by reference herein in their entireties.

BACKGROUND

The disclosure relates to a neural network system for performing deep learning on an input model by using an operation processing graph of a neural network, and more particularly, to a neural network system for efficiently performing computation on an operation processing graph by using internal memory for the operation processing graph and to a method of processing a neural network model by using the neural network system.

Artificial neural networks (ANNs) refer to computational architectures modeling biological brains. Deep learning, machine learning, or the like may be implemented based on ANNs. Recently, as operations to be processed by using an ANN have rapidly increased, it is desired to efficiently perform operation processing by using an ANN.

SUMMARY

According to embodiments, a neural network system for processing a neural network model including an operation processing graph that includes a plurality of operations, includes an operation processor including an internal memory storing a first module input feature map. The operation processor is configured to obtain a first branch output feature map by performing a first operation among the plurality of operations, based on the stored first module input feature map, and obtain a second branch output feature map by performing a second operation among the plurality of operations after the first operation is performed, based on the stored first module input feature map. The internal memory maintains storage of the first module input feature map while the first operation is performed.

According to embodiments, a method of processing a neural network model including an operation processing graph that includes a plurality of operations, using an operation processor including an internal memory, includes storing a first module input feature map in the internal memory. The method further includes obtaining a first branch output feature map by performing a first operation among the plurality of operations, based on the stored first module input feature map, obtaining a second branch output feature map by performing a second operation among the plurality of operations, based on the stored first module input feature map, and maintaining storage of the first module input feature map in the internal memory, while the first operation is performed.

According to embodiments, a neural network device for processing an operation processing graph including a plurality of operations, includes an internal memory storing a first feature map. The neural network device further includes at least one resource configured to obtain a second feature map by performing a first operation among the plurality of operations, based on the stored first feature map, store the obtained second feature map in the internal memory, and obtain a third feature map by performing a second operation among the plurality of operations, based on the stored second feature map.

BRIEF DESCRIPTION OF THE DRAWINGS

FIG. 18 is a block diagram illustrating an electronic system according to embodiments.

DETAILED DESCRIPTION OF THE EMBODIMENTS

Figure 1:
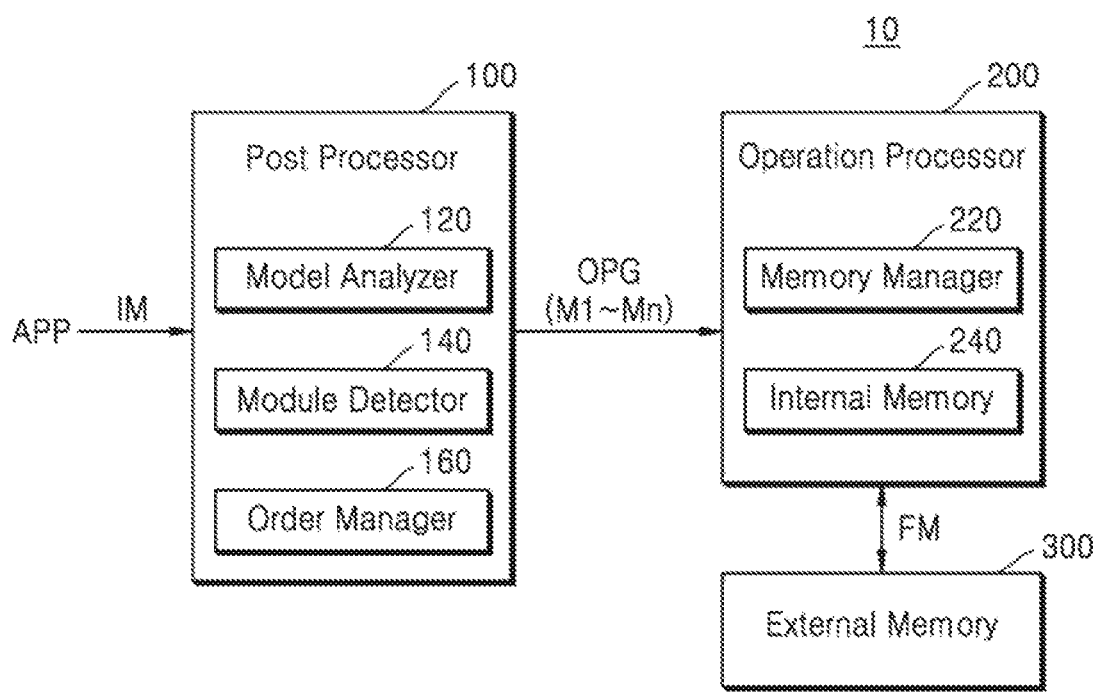
FIG. 1 is a block diagram illustrating a neural network system according to embodiments.

FIG. 1 is a block diagram illustrating a neural network system according to embodiments.

Referring to FIG. 1, a neural network system 10 may include a plurality of applications APP, a post processor 100, an operation processor 200, and external memory 300. The plurality of applications APP may be generated by various application programming interfaces (APIs) and may perform various tasks by using a neural network model. The neural network model may include various neural network models, such as a convolution neural network (CNN) including GoogLeNet, AlexNet, VGG Network, and the like, a region with convolution neural network (R-CNN), a region proposal network (RPN), a recurrent neural network (RNN), a stacking-based deep neural network (S-DNN), a deep belief network (DBN), a restricted Boltzman machine (RBM), a fully convolutional network, a long short term memory (LSTM) network, and a classification network, without being limited thereto. In addition, the neural network model performing one task may include sub-neural networks, and the sub-neural networks may include heterogeneous neural networks and may be implemented with heterogeneous neural network models.

The plurality of applications APP may request the post processor 100 to perform data processing using a neural network model by outputting an input model IM to the post processor 100.

The post processor 100 may include a model analyzer 120, a module detector 140, and an order manager 160. Each of the components included in the post processor 100 may be implemented by software and may be implemented with a neural network platform such as an evolutionary deep network (EDEN). In another example, each of the components included in the post processor 100 may be implemented by hardware such as an electronic circuit, a central processing unit (CPU), or an application processor (AP). In one example, the post processor 100 may be implemented with a framework of a neural network.

The model analyzer 120 may receive, from the plurality of applications APP, the input model IM including data for use of a neural network, and may generate an operation processing graph OPG by analyzing the input model IM. The operation processing graph OPG may refer to a data structure represented by a graph including a plurality of operation nodes. The model analyzer 120 may output the operation processing graph OPG to the module detector 140.

The module detector 140 may partition the operation processing graph OPG into a plurality of modules M1 to Mn. As used herein, the term "module" may refer to a unit group of a plurality of operations receiving one input feature map and thus outputting one output feature map. That is, a module may receive an input feature map via one input node and may generate an output feature map via one output node. The module detector 140 may classify, as a module, at least one operation sharing an input node and an output node among operations included in the operation processing graph OPG and may generate the operation processing graph OPG partitioned into the plurality of modules M1 to Mn. This will be described in detail with reference to FIG. 4.

The order manager 160 may determine a processing order of a plurality of branches included in a module. As used herein, the term "branch" may refer to a unit group of a plurality of operations that are consecutively connected in series. In embodiments, the order manager 160 may determine a processing order of a plurality of branches such that a used amount of memory may be reduced. This will be described in detail with reference to FIG. 4.

The operation processor 200 may include an operation resource including various operation processing devices such as a central processing unit (CPU), a graphics processing unit (GPU), an application processor (AP), a digital signal processor (DSP), a field-programmable gate array (FPGA), a neural network processing unit (NPU), an electronic control unit (ECU), an image signal processor (ISP), and the like. The operation processor 200 may include specific task-dedicated hardware, such as an NPU, used to process an operation by using a neural network model.

In one example, the operation processor 200 may include a communication resource capable of supporting internal communication, such as a system bus, peripheral component interconnect (PCI), PCI express (PCIe) serial advanced technology attachment (SATA), small computer system interface (SCSI), and serial attached SCSI (SAS) and/or supporting external communication such as universal serial bus (USB), Ethernet, WiFi, Bluetooth, near field communication (NFC), radio frequency identification (RFID), and mobile telecommunication.

In one example, the operation processor 200 may include heterogeneous resources. In one example, the operation processor 200 may include an NPU as a first resource, and a GPU as a second resource.

The operation processor 200 may include a memory manager 220 and internal memory 240. The operation processor 200 may receive the operation processing graph OPG, which is partitioned into the plurality of modules M1 to Mn, from the post processor 100 and may perform at least one operation included in the operation processing graph OPG by using the internal memory 240.

The memory manager 220 may determine memory for the processing of a plurality of operations included in the operation processing graph OPG. Memory for storing an input feature map and weights therein is used for the operation processor 200 to perform an operation included in the operation processing graph OPG, and the memory manager 220 may determine, as memory for performing an operation, one of the internal memory 240 and the external memory 300, based on an amount of memory (for example, an amount of data of an input feature map, an amount of data of an output feature map, an amount of data of weights, and working memory) used for operation processing.

The internal memory 240 is memory located inside the operation processor 200 for operation processing of the operation processor 200 and may include at least one storage device. As an example, the internal memory 240 may include at least one selected from the group consisting of volatile memory and nonvolatile memory, the nonvolatile memory may include flash memory, phase-change random access memory (PRAM), magnetic random access memory (MRAM), resistive random access memory (RRAM), ferroelectric random access memory (FRAM), or the like, and the volatile memory may include dynamic random access memory (DRAM), static random access memory (SRAM), synchronous DRAM (SDRAM), a latch, a flip-flop, a register, or the like. Herein, although the internal memory 240 is described as being SRAM, the inventive concept is not limited thereto.

The external memory 300 is memory located outside the operation processor 200 for various operations of the neural network system 10 and may include at least one storage device. As an example, the external memory 300 may include at least one selected from the group consisting of volatile memory and nonvolatile memory, the nonvolatile memory may include flash memory, PRAM, MRAM, RRAM, FRAM, or the like, and the volatile memory may include DRAM, SRAM, SDRAM, a latch, a flip-flop, a register, or the like. Herein, although the external memory 300 is described as being DRAM, the inventive concept is not limited thereto.

The operation processor 200 may store a feature map FM in the external memory 300 or may load the stored feature map FM from the external memory 300. For this purpose, the operation processor 200 may further include an access device, such as direct memory access (DMA), memory DMA (MDMA), peripheral DMA (PDMA), remote DMA (RDMA), or smart DMA (SDMA), to control access to the external memory 300.

The operation processor 200 according to embodiments may store an input feature map in the internal memory 240 and may perform computation on a plurality of branches included in one of the modules M1 to Mn by repeatedly using the input feature map stored in the internal memory 240. Therefore, the operation processor 200 may perform operation processing by using the internal memory 240 having a relatively high data input/output rate instead of using the external memory 300 connected thereto via various access devices, and an operation processing speed of the operation processor 200 may be increased.

The post processor 100 may further include a task manager, which allocates at least a portion of the operation processing graph OPG based on structural features thereof, kinds of operations included therein, or the like, and a compiler, which performs compiling for translating the operation processing graph OPG into a programming language that may be understood by the operation processor 200. In addition, the post processor 100 may further include an operating system for driving various functional blocks, and the operating system may include various mobile operating systems, on-line operating systems, off-line operating systems, and the like. In one example, the operating system may be implemented with Linux, Linux-based Android, Windows, iOS, Mac OS, Chromium OS, or the like.

In addition, although FIG. 1 illustrates an example in which the memory manager 220 is included in the operation processor 200, this is an example, and the memory manager 220 may be included in the post processor 100 in another example. That is, in embodiments, the post processor 100 may determine memory for processing operations included in the operation processing graph OPG.

In addition, likewise, although FIG. 1 illustrates that the module detector 140 and the order manager 160 are included in the post processor 100, this is an example, and at least one selected from the module detector 140 and the order manager 160 may be included in the operation processor 200 in another example. That is, in embodiments, the operation processor 200 may partition the operation processing graph OPG into the plurality of modules M1 to Mn and may determine a processing order of a plurality of branches included in a module.

Figure 2:
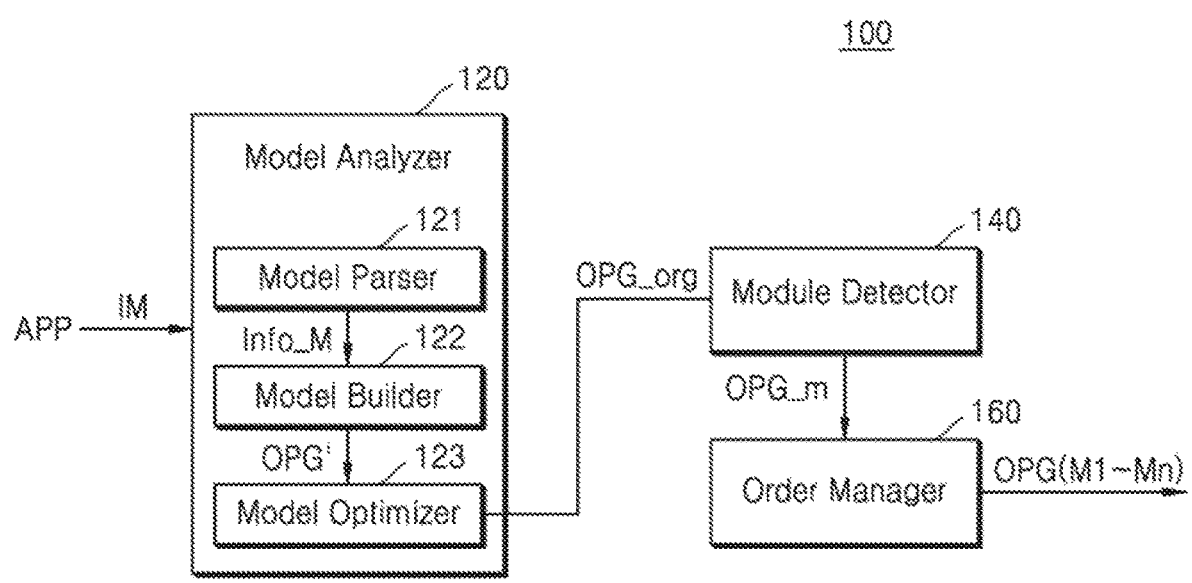
FIG. 2 is a block diagram illustrating a post processor according to embodiments.

FIG. 2 is a block diagram illustrating a post processor according to embodiments. Repeated descriptions given with reference to FIG. 1 will be omitted.

Referring to FIG. 2, the post processor 100 may include the model analyzer 120, the module detector 140, and an order manager 160, and the model analyzer 120 may include a model parser 121, a model builder 122, and a model optimizer 123.

The model parser 121 may generate model information Info_M by parsing the input model IM received from an application APP. The input model IM may include request information for executing instructions programmed in the application APP by using a neural network, and the term "parsing" may refer to a process of analyzing grammatical construction or syntax of an input model. In one example, the model information Info_M may include metadata including size information of the input model IM.

The model builder 122 may generate an operation processing graph OPG' from the input model IM, based on the model information Info_M received from the model parser 121. The operation processing graph OPG' may refer to a graph including a plurality of operation nodes.

The model optimizer 123 may perform an optimization operation on the operation processing graph OPG' and may output, to the module detector 140, an original operation processing graph OPG_org generated as a result of the optimization operation. The optimization operation may refer to an operation of minimizing and optimizing an amount of operation processing for the operation processing graph OPG'. In embodiments, the optimization operation may include a graph substitution operation for substituting at least a portion of the operation processing graph OPG' with another graph, a graph merge operation for merging at least portions of the operation processing graph OPG', and a graph division operation for dividing at least a portion out of the operation processing graph OPG'.

The module detector 140 may receive the original operation processing graph OPG_org, may detect the plurality of modules M1 to Mn by analyzing the received original operation processing graph OPG_org, and thus, may generate a module-partitioned operation processing graph OPG_m. In one example, the module detector 140 may classify, as a module, a plurality of branches receiving one input feature map and thus generating one output feature map.

In embodiments, the module detector 140 may detect a skip connection operation, may exclude the skip connection operation, and then, may partition the original operation processing graph OPG_org into the plurality of modules M1 to Mn. In addition, the module detector 140 may generate the module-partitioned operation processing graph OPG_m by partitioning the original operation processing graph OPG_org into the plurality of modules M1 to Mn and then causing the skip connection operation again to be included again therein. According to embodiments, the skip connection operation may be processed by using the external memory 300. A method of generating the module-partitioned operation processing graph OPG_m will be described below in detail with reference to FIGS. 3 and 4.

As used herein, the term "skip connection operation" may refer to an operation connected between two branches. In one example, the module detector 140 may determine the skip connection operation based on a layer length between both nodes connected to an operation, and this will be described below in detail with reference to FIG. 4.

The order manager 160 may receive the module-partitioned operation processing graph OPG_m and may determine a processing order among a plurality of branches included in a module. In embodiments, the order manager 160 may determine the processing order such that an amount of processing memory is minimized, and may generate the operation processing graph OPG by causing information about the determined processing order to be included in the module-partitioned operation processing graph OPG_m.

According to embodiments, the post processor 100 may partition the operation processing graph OPG into modules and adjust the operation processing graph OPG between a plurality of branches included in a module, thereby minimizing an amount of memory used to process the operation processing graph OPG, and thus, the operation processor 200 (FIG. 1) may perform operations included in the operation processing graph OPG by efficiently using the internal memory 240.

Figure 3:
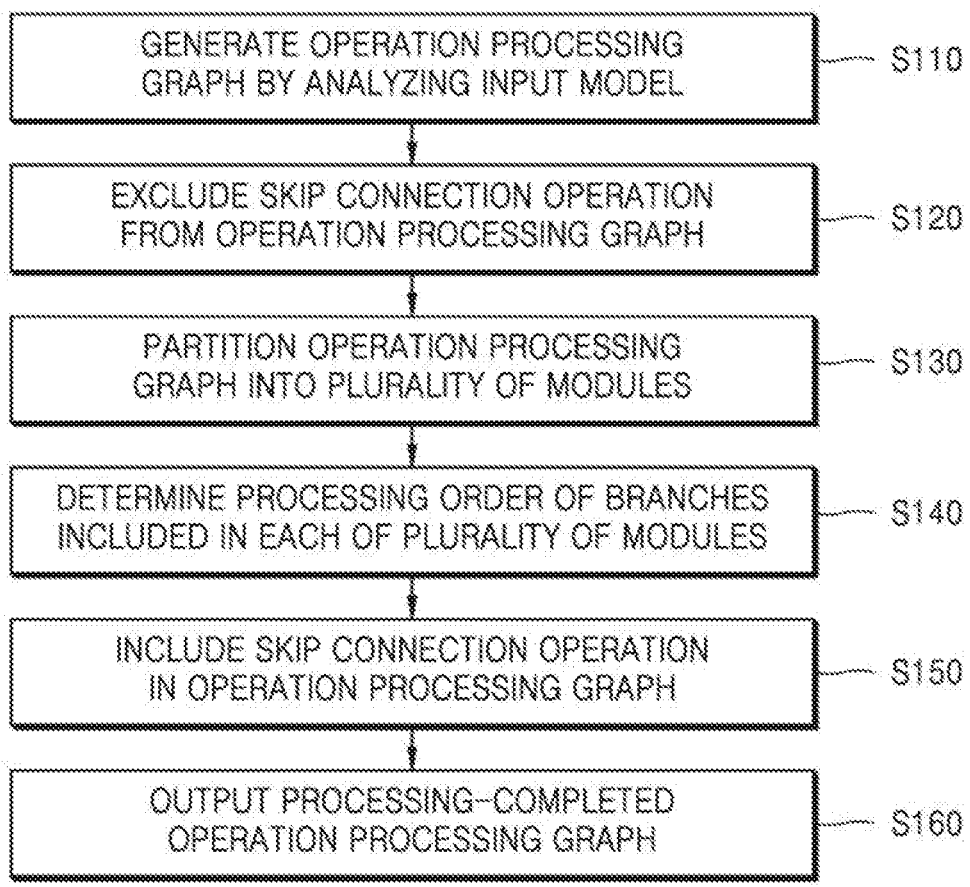
FIG. 3 is a flowchart illustrating operations of a post processor according to embodiments.
Figure 4:
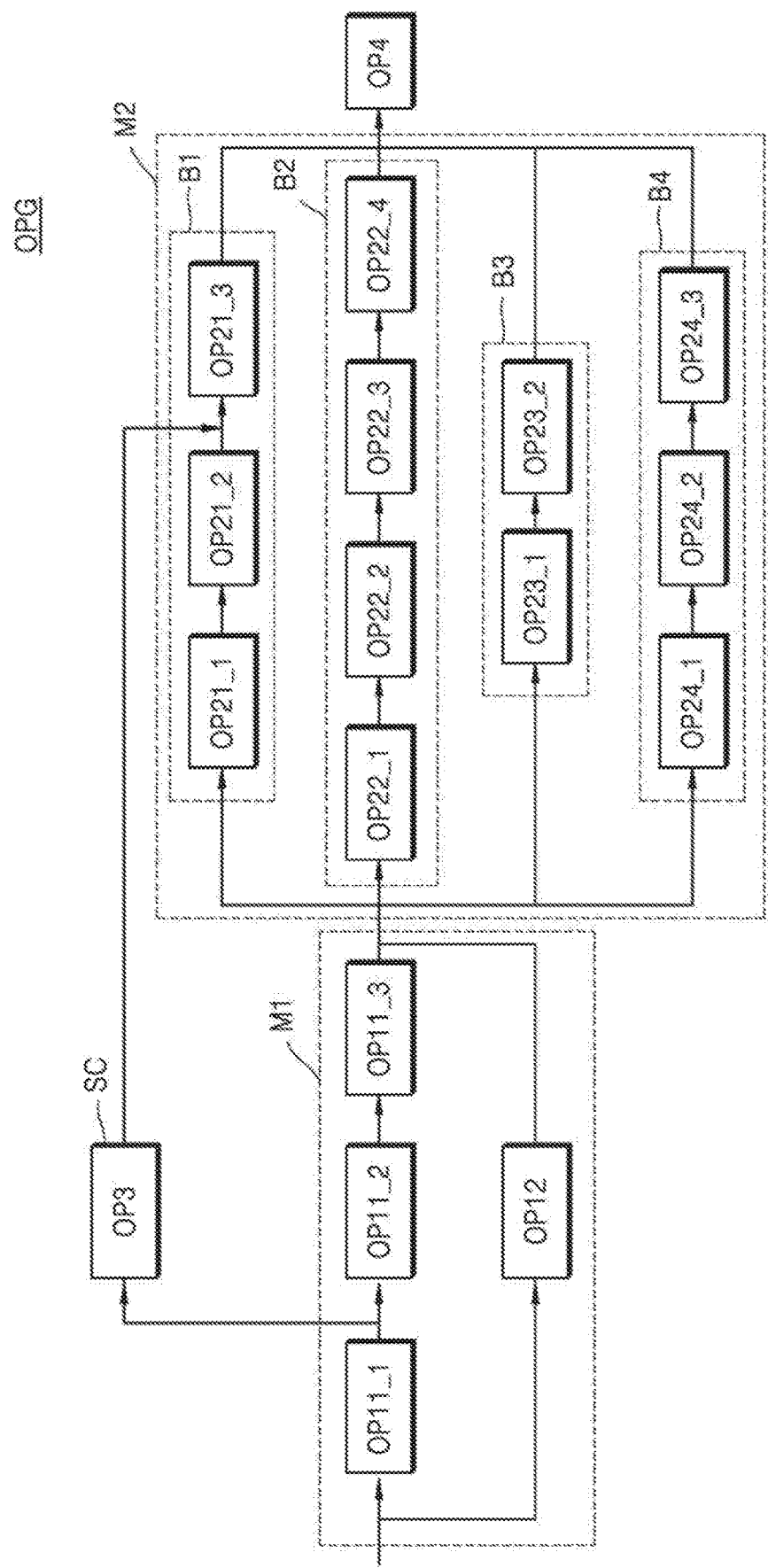
FIG. 4 is a diagram illustrating an operation processing graph according to embodiments.

FIG. 3 is a flowchart illustrating operations of a post processor according to embodiments, and FIG. 4 is a diagram illustrating an operation processing graph according to embodiments.

Referring to FIGS. 1, 3, and 4, the post processor 100 may generate the operation processing graph OPG by analyzing the input model IM (S110). In the example of FIG. 4, by analyzing the input model IM, the post processor 100 may generate the operation processing graph OPG, which includes a plurality of first operations OP11_1 to OP11_3 and OP12, a plurality of second operations OP21_1 to OP21_3, OP22_1 to OP22_4, OP23_1 and OP23_2, and OP24_1 to OP24_3, a third operation OP3, and a fourth operation OP4.

The plurality of first operations OP11_1 to OP11_3 and OP12, the plurality of second operations OP21_1 to OP21_3, OP22_1 to OP22_4, OP23_1 and OP23_2, and OP24_1 to OP24_3, the third operation OP3, and the fourth operation OP4 may respectively represent various mathematical operations (for example, a convolution operation, a rectified linear unit operation, a memory copy operation, a concatenate operation, and the like), and may be respectively operations that are identical to or different from each other.

The post processor 100 may exclude a skip connection operation SC from the operation processing graph OPG (S120). In embodiments, the post processor 100 may detect a layer length between both nodes to which an operation is connected and may determine the skip connection operation SC based thereon. In embodiments, the post processor 100 may determine, as the skip connection operation SC, an operation connected between branches respectively included in different modules.

In the example of FIG. 4, the post processor 100 may determine, as the skip connection operation SC, the third operation OP3 connected between layers (for example, the number of operations connected between nodes) that are greater in number than a predetermined number and may exclude the third operation OP3 when partitioning the operation processing graph OPG into modules. In another example, the post processor 100 may determine, as the skip connection operation SC, the third operation OP3 connected between a first module M1 and a first branch B1 of a second module M2 and may exclude the third operation OP3 when partitioning the operation processing graph OPG into modules.

Referring again to FIG. 3, the post processor 100 may partition the operation processing graph OPG, from which the skip connection operation SC is excluded, into a plurality of modules M1 and M2 (S130). In embodiments, the post processor 100 may classify, as one module, a plurality of operations receiving one input feature map and generating one output feature map. In embodiments, the post processor 100 may classify, as one module, operations included in a plurality of parallel-connected branches sharing one input node and one output node.

In the example of FIG. 4, the post processor 100 may classify, as the first module M1, the plurality of first operations OP11_1 to OP11_3 and OP12, which receive one input feature map, are respectively performed, and then output one output feature map, and likewise, may classify, as the second module M2, the plurality of second operations OP21_1 to OP21_3, OP22_1 to OP22_4, OP23_1 and OP23_2, and OP24_1 to OP24_3. In another example, the post processor 100 may detect a first branch B1, a second branch B2, a third branch B3, and a fourth branch B4, which are connected in parallel and share one input node and one output node, and may classify, as the second module M2, the plurality of second operations OP21_1 to OP21_3, OP22_1 to OP22_4, OP23_1 and OP23_2, and OP24_1 to OP24_3, which are included in the first branch B1, the second branch B2, the third branch B3, and the fourth branch B4.

Referring again to FIG. 3, the post processor 100 may determine a processing order for branches included in each of the plurality of modules M1 and M2 (S140). In embodiments, the post processor 100 may determine a processing order for a plurality of branches B1 to B4, based on an amount of data used to process each of the plurality of branches B1 to B4.

In the example of the second module M2 of FIG. 4, the post processor 100 may change the processing order of the first to fourth branches B1 to B4. In one example, the post processor 100 may change the processing order in order of increasing amount of data used for processing. In an example in which the third branch B3, the first branch B1, the fourth branch B4, and the second branch B2 respectively have increasing amounts of data used for processing in this stated order, the post processor 100 may change the processing order in order of the third branch B3, the first branch B1, the fourth branch B4, and the second branch B2.

In another example, the post processor 100 may change the processing order in order of decreasing amount of data used for processing. In an example in which the third branch B3, the first branch B1, the fourth branch B4, and the second branch B2 respectively have increasing amounts of data used for processing in this stated order, the post processor 100 may change the processing order in order of the second branch B2, the fourth branch B4, the first branch B1, and the third branch B3.

Referring again to FIG. 3, the post processor 100 may include the skip connection operation SC again in the operation processing graph OPG (S150), and may output the processing-completed operation processing graph OPG to the operation processor 200 (S160).

Figure 5:
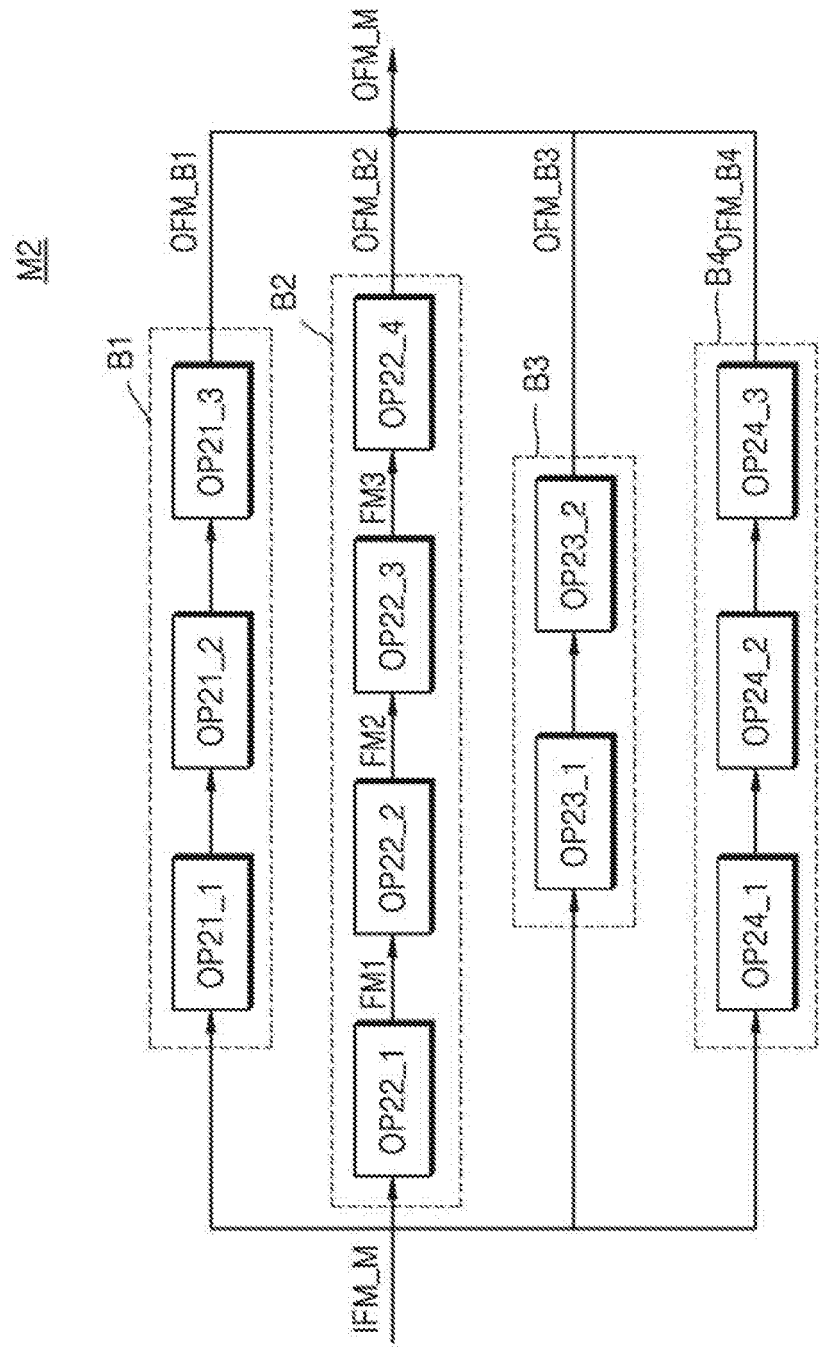
FIG. 5 is a diagram illustrating a module according to embodiments.

FIG. 5 is a diagram illustrating a module according to embodiments. Repeated descriptions given with reference to FIG. 4 will be omitted.

Referring to FIGS. 1 and 5, the second module M2 may include the first branch B1 to the fourth branch B4. The operation processor 200 may generate a first branch output feature map OFM_B1 by sequentially performing first branch operations OP21_1 to OP21_3 in this stated order by using a module input feature map IFM_M as an input and may generate a second branch output feature map OFM_B2 by sequentially performing second branch operations OP22_1 to OP22_4 in this stated order by using the module input feature map IFM_M as an input.

In addition, the operation processor 200 may generate a third branch output feature map OFM_B3 by sequentially performing third branch operations OP23_1 and OP23_2 in this stated order by using the module input feature map IFM_M as an input and may generate a fourth branch output feature map OFM_B4 by sequentially performing fourth branch operations OP24_1 to OP24_3 in this stated order by using the module input feature map IFM_M as an input.

In one example, the operation processor 200 may generate a first feature map FM1 by performing a first operation OP22_1 by using the module input feature map IFM_M as an input and may generate a second feature map FM2 by performing a second operation OP22_2 by using the first feature map FM1 as an input. In addition, the operation processor 200 may generate a third feature map FM3 by performing a third operation OP22_3 by using the second feature map FM2 as an input and may generate the second branch output feature map OFM_B2 by performing a fourth operation OP22_4 by using the third feature map FM3 as an input.

The operation processor 200 may generate a module output feature map OFM_M by using the first branch output feature map OFM_B1 to the fourth branch output feature map OFM_B4. In one example, the operation processor 200 may generate the module output feature map OFM_M by concatenating the first to fourth branch output feature maps OFM_B1 to OFM_B4 by using a concatenate function.

Figure 6:
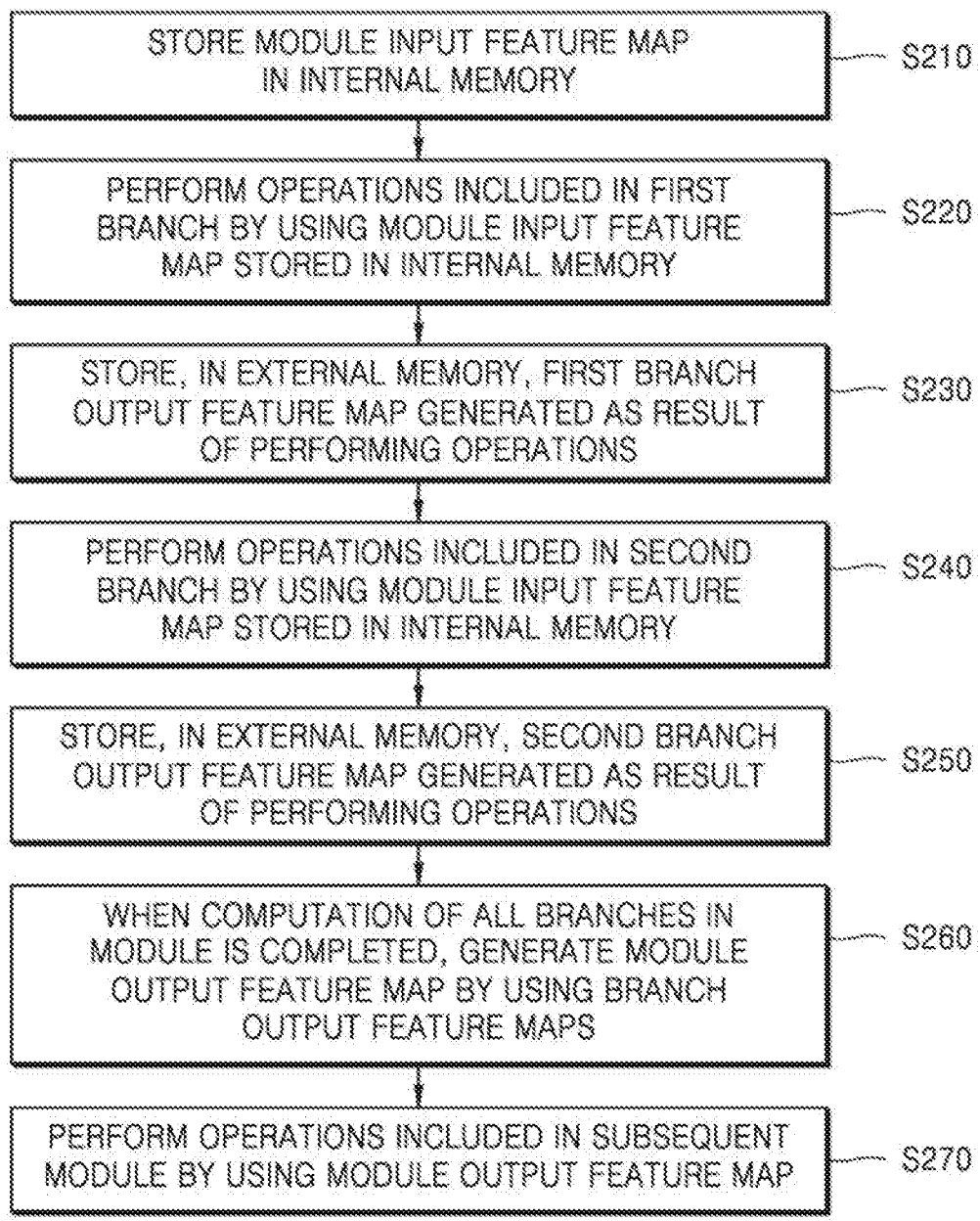
FIG. 6 is a flowchart illustrating a method of operating an operation processor, according to embodiments.

FIG. 6 is a flowchart illustrating a method of operating an operation processor, according to embodiments. FIG. 6 illustrates embodiments of a method of operating an operation processor by using a reusing policy.

Referring to FIGS. 1, 5, and 6, the operation processor 200 may store the module input feature map IFM_M in the internal memory 240 (S210). The operation processor 200 may consecutively perform the operations OP21_1 to OP21_3 included in the first branch B1 by using the module input feature map IFM_M stored in the internal memory 240 (S220). The operation processor 200 may store, in the external memory 300, the first branch output feature map OFM_B1 generated as a result of consecutively performing the operations OP21_1 to OP21_3 included in the first branch B1 (S230).

The operation processor 200 may consecutively perform the operations OP22_1 to OP22_4 included in the second branch B2 by reusing the module input feature map IFM_M stored in the internal memory 240 (S240). The operation processor 200 may store, in the external memory 300, the second branch output feature map OFM_B2 generated as a result of consecutively performing the operations OP22_1 to OP22_4 included in the second branch B2 (S250).

Herein, a policy of using the internal memory 240 such that the operations included in the plurality of branches B1 to B4 are performed by reusing the module input feature map IFM_M stored in the internal memory 240 as described above may be referred to as a reusing policy.

In a like manner, the operation processor 200 may perform operations (for example, operations included in the third branch B3 and the fourth branch B4) included in all branches in a module and, when the computation of all the branches in the module is completed, may generate the module output feature map OFM_M by using the plurality of branch output feature maps OFM_B1 to OFM_B4 stored in the external memory 300 (S260). The operation processor 200 may perform one or more operations (for example, the fourth operation OP4 of FIG. 4) included in a subsequent module by using the module output feature map OFM_M loaded from the external memory 300 (S270).

The operation processor 200 according to embodiments may use the module input feature map IFM_M stored in the internal memory 240 in performing computation on the plurality of branches B1 to B4, based on the reusing policy, thereby reducing amounts of data input to and output from the external memory 300 and increasing the operation processing speed.

Figure 7:
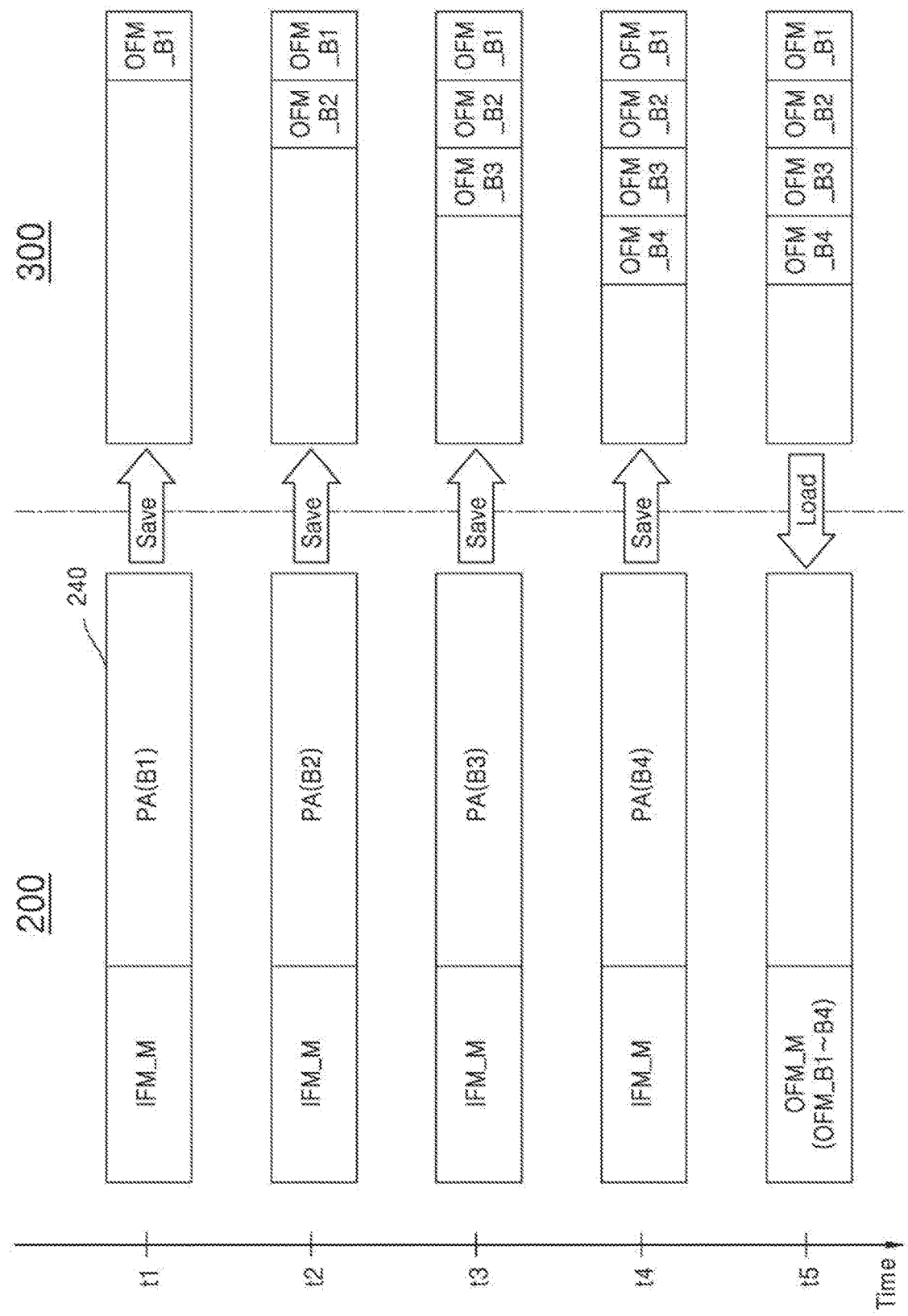
FIG. 7 is a diagram illustrating a neural network processing method according to a reusing policy, according to embodiments.

FIG. 7 is a diagram illustrating a neural network processing method according to a reusing policy, according to embodiments.

Referring to FIGS. 1 and 7, at a first time point t1, the operation processor 200 may store the module input feature map IFM_M in the internal memory 240 and may process operations included in the first branch B1 by using the module input feature map IFM_M stored in the internal memory 240. When processing the operations included in the first branch B1, the operation processor 200 may use the remaining processing area PA except for an area in which the module input feature map IFM_M is stored. In one example, the processing area PA may include a memory area for processing at least one selected from the group consisting of working memory, a weight value, and an output feature map generated as a result of an operation. The operation processor 200 may store the first branch output feature map OFM_B1, which is generated by processing the operations included in the first branch B1, in the external memory 300 through direct memory access (DMA).

At a second time point t2, the operation processor 200 may process operations included in the second branch B2 by using the module input feature map IFM_M stored in the internal memory 240 and may store, in the external memory 300, the second branch output feature map OFM_B2 generated as a result thereof. At a third time point t3, the operation processor 200 may process operations included in the third branch B3 by using the module input feature map IFM_M stored in the internal memory 240 and may store, in the external memory 300, the third branch output feature map OFM_B3 generated as a result thereof. In addition, at a fourth time point t4, the operation processor 200 may process operations included in the fourth branch B4 by using the module input feature map IFM_M stored in the internal memory 240 and may store, in the external memory 300, the fourth branch output feature map OFM_B4 generated as a result thereof.

At a fifth time point t5, the operation processor 200 may load the first to fourth branch output feature maps OFM_B1 to OFM_B4 stored in the external memory 300 and may generate the module output feature map OFM_M by using the loaded first to fourth branch output feature maps OFM_B1 to OFM_B4. The operation processor 200 may store the generated module output feature map OFM_M in the internal memory 240 and may use the module output feature map OFM_M as an input to a subsequent module or operation.

Figure 8:
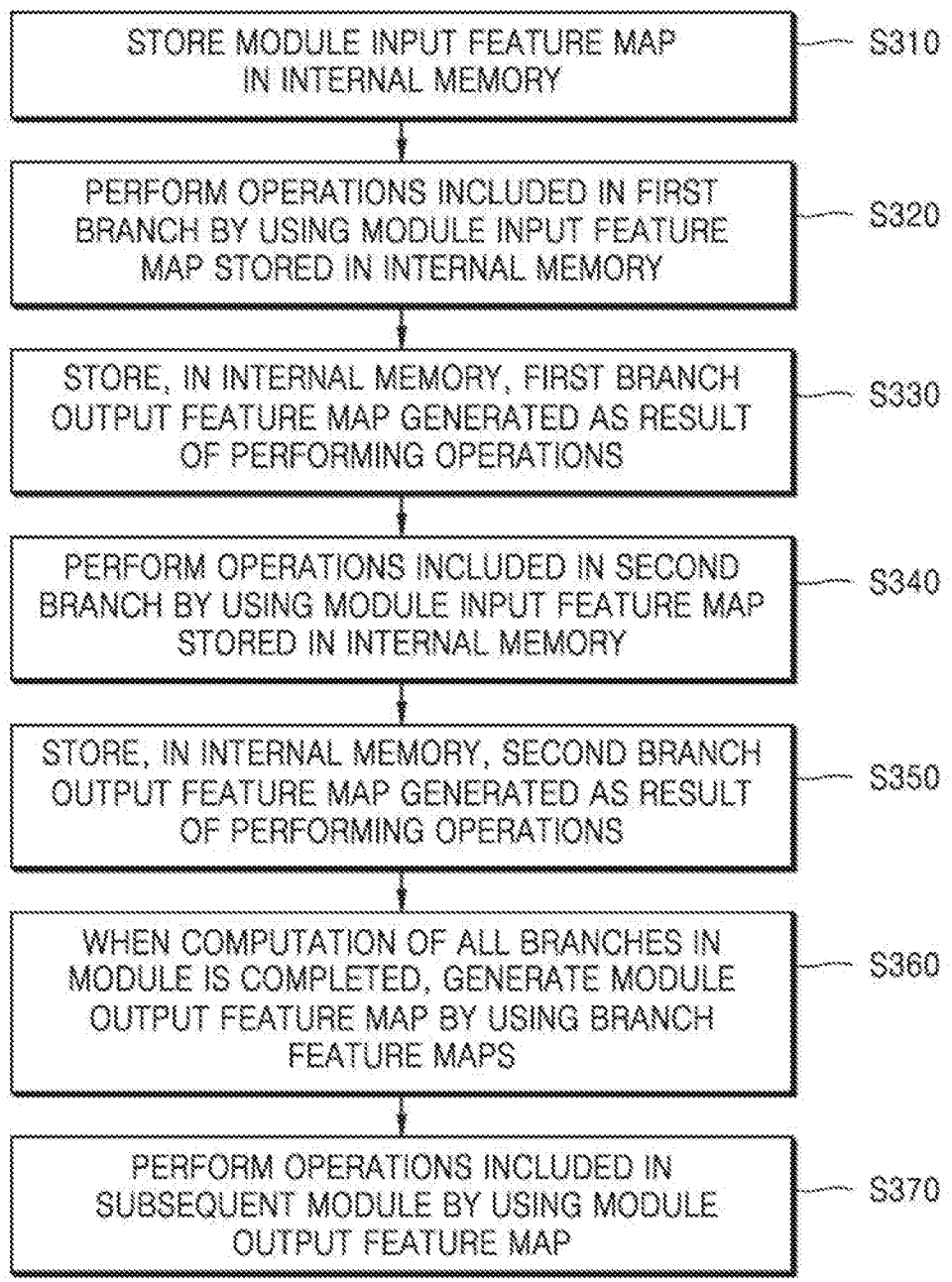
FIG. 8 is a flowchart illustrating a method of operating an operation processor, according to embodiments.

FIG. 8 is a flowchart illustrating a method of operating an operation processor, according to embodiments. FIG. 8 illustrates embodiments of a method of operating an operation processor by using a reusing policy and a module forwarding policy.

Referring to FIGS. 1, 5, and 8, the operation processor 200 may store the module input feature map IFM_M in the internal memory 240 (S310). The operation processor 200 may consecutively perform the operations OP21_1 to OP21_3 included in the first branch B1 by using the module input feature map IFM_M stored in the internal memory 240 (S320). The operation processor 200 may store, in the internal memory 240, the first branch output feature map OFM_B1 generated as a result of consecutively performing the operations OP21_1 to OP21_3 included in the first branch B1 (S330).

The operation processor 200 may consecutively perform the operations OP22_1 to OP22_4 included in the second branch B2 by reusing the module input feature map IFM_M stored in the internal memory 240 (S340). The operation processor 200 may store, in the internal memory 240, the second branch output feature map OFM_B2 generated as a result of consecutively performing the operations OP22_1 to OP22_4 included in the second branch B2 (S350).

In a like manner, the operation processor 200 may perform operations (for example, operations included in the third branch B3 and the fourth branch B4) included in all branches in a module and, when the computation of all the branches in the module is completed, may generate the module output feature map OFM_M by using the plurality of branch output feature maps OFM_B1 to OFM_B4 stored in the internal memory 240 (S360). The operation processor 200 may perform one or more operations (for example, the fourth operation OP4 of FIG. 4) included in a subsequent module by using the module output feature map OFM_M stored in the internal memory 240 (S370).

Herein, a policy of using the internal memory 240 such that, as in operations S360 and S370, the module output feature map OFM_M is stored in the internal memory 240 and the module output feature map OFM_M stored in the internal memory 240 is used as an input to the subsequent module or operation may be referred to as a module forwarding policy.

The operation processor 200 according to embodiments may use the module output feature map OFM_M, which is stored in the internal memory 240, as an input to the subsequent module or operation, based on the module forwarding policy, thereby reducing the amounts of data input to and output from the external memory 300 and increasing the operation processing speed.

Although FIG. 8 illustrates embodiments in which the reusing policy and the module forwarding policy are used together, this is an example, and in embodiments, the operation processor 200 may perform a neural network processing method using the internal memory 240 by using only the module forwarding policy. That is, in one example, the operation processor 200 may store the module output feature map OFM_M in the internal memory 240 by using the module input feature map IFM_M stored in the external memory 300 and may use, as an input to the subsequent module or operation, the module output feature map OFM_M stored in the internal memory 240.

Figure 9:
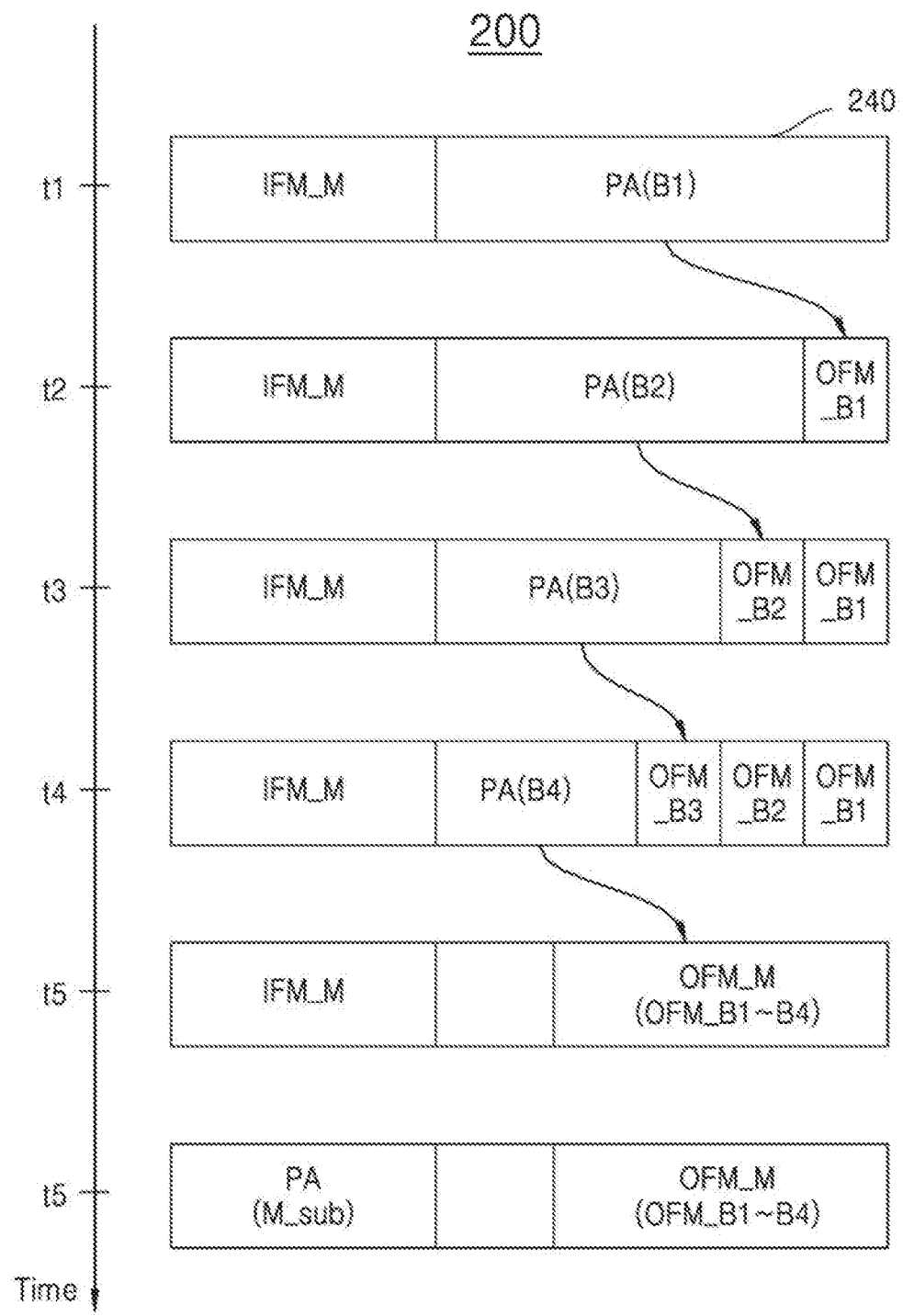
FIG. 9 is a diagram illustrating a neural network processing method according to a reusing policy and a module forwarding policy, according to embodiments.

FIG. 9 is a diagram illustrating a neural network processing method according to a reusing policy and a module forwarding policy, according to embodiments.

Referring to FIGS. 1 and 9, at a first time point t1, the operation processor 200 may store the module input feature map IFM_M in the internal memory 240 and may process the operations included in the first branch B1 by using the module input feature map IFM_M stored in the internal memory 240. The operation processor 200 may store, in the internal memory 240, the first branch output feature map OFM_B1 generated by processing the operations included in the first branch B1.

At a second time point t2, the operation processor 200 may process the operations included in the second branch B2 by using the module input feature map IFM_M stored in the internal memory 240 and may store, in the internal memory 240, the second branch output feature map OFM_B2 generated as a result thereof. At a third time point t3, the operation processor 200 may process the operations included in the third branch B3 by using the module input feature map IFM_M stored in the internal memory 240 and may store, in the internal memory 240, the third branch output feature map OFM_B3 generated as a result thereof. In addition, at a fourth time point t4, the operation processor 200 may process the operations included in the fourth branch B4 by using the module input feature map IFM_M stored in the internal memory 240 and may store, in the internal memory 240, the fourth branch output feature map OFM_B4 generated as a result thereof.

At a fifth time point t5, the operation processor 200 may generate the module output feature map OFM_M by using the first to fourth branch output feature maps OFM_B1 to OFM_B4 stored in the internal memory 240 and may store the module output feature map OFM_M in the internal memory 240. At a sixth time point t6, the operation processor 200 may perform operations included in a subsequent module M_sub by using the module output feature map OFM_M. In embodiments, because the module input feature map IFM_M is no longer used for the subsequent module M_sub, the operation processor 200 may perform the operations included in the subsequent module M_sub by using, as the processing area PA, an area in which the module input feature map IFM_M has been stored until the fifth time point t5.

Figure 10:
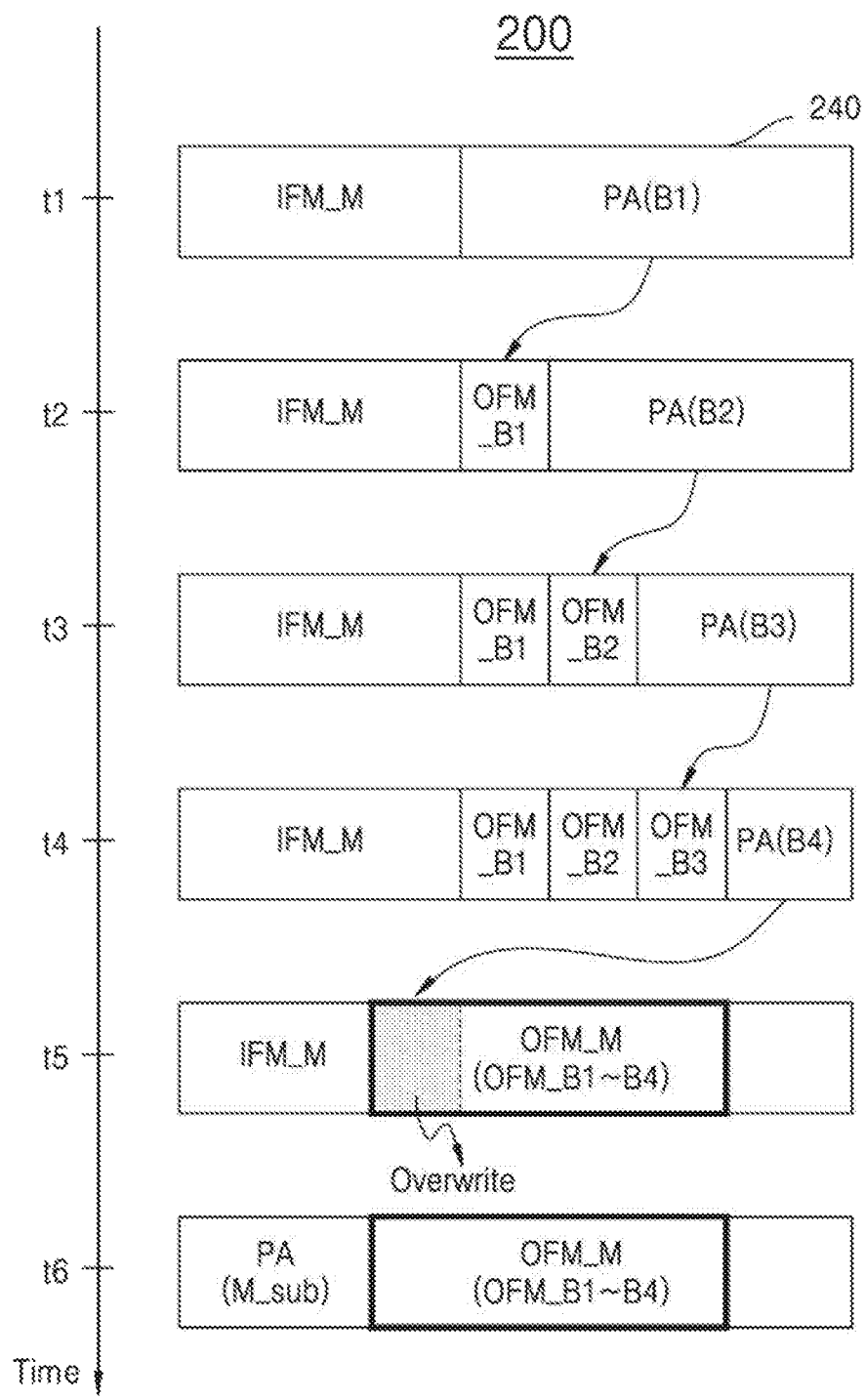
FIG. 10 is a diagram illustrating a neural network processing method according to a reusing policy and a module forwarding policy, according to embodiments.

FIG. 10 is a diagram illustrating a neural network processing method according to a reusing policy and a module forwarding policy, according to embodiments. Because operations of an operation processor at the first to third time points t1 to t3 of FIG. 10 may be identical or similar to those described above with reference to FIG. 9, descriptions thereof will be omitted.

Referring to FIGS. 1 and 10, at the fourth time point t4, the operation processor 200 may process the operations included in the fourth branch B4 by using the module input feature map IFM_M stored in the internal memory 240 and may store, in the internal memory 240, the fourth branch output feature map OFM_B4 generated as a result thereof. According to embodiments, the operation processor 200 may overwrite, with the fourth branch output feature map OFM_B4, at least a portion of an area in which the module input feature map IFM_M is stored.

At the fifth time point t5, the operation processor 200 may generate the module output feature map OFM_M by using the first to fourth branch output feature maps OFM_B1 to OFM_B4 stored in the internal memory 240. At the sixth time point t6, the operation processor 200 may perform the operations included in the subsequent module M_sub by using the module output feature map OFM_M.

In embodiments, because the module input feature map IFM_M is no longer used after a result of the last operation in the plurality of branches B1 to B4 is generated, the operation processor 200 may use, as an area for the fourth branch output feature map OFM_B4 that is the result of the last operation, at least a portion of an area in which the module input feature map IFM_M has been stored until the fourth time point t4 and may perform the operations included in the subsequent module M_sub by using, as the processing area PA, the remaining area in which the module input feature map IFM_M is stored.

Figure 11:
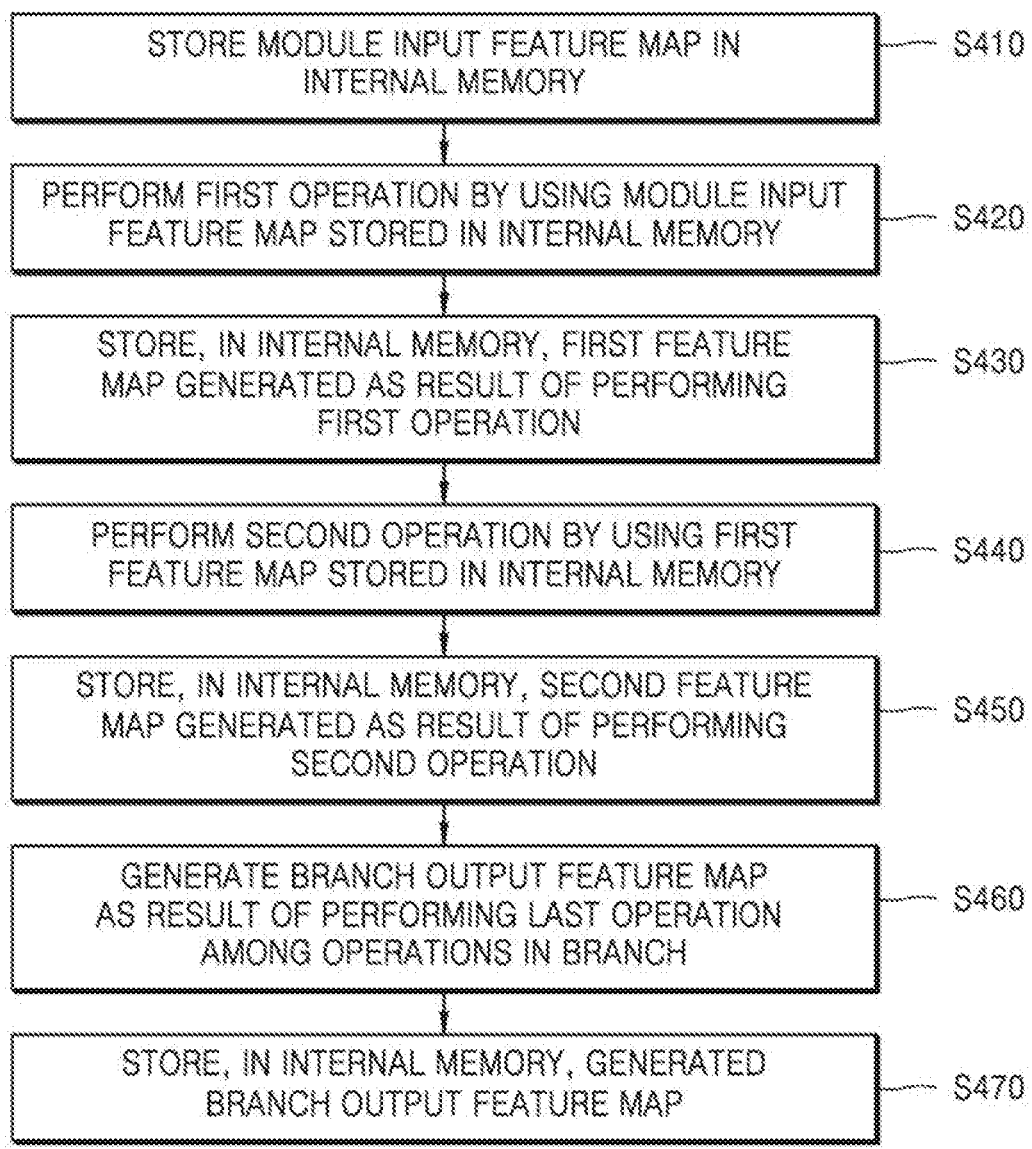
FIG. 11 is a flowchart illustrating a method of operating an operation processor, according to embodiments.

FIG. 11 is a flowchart illustrating a method of operating an operation processor, according to embodiments. FIG. 11 illustrates embodiments of a method of operating an operation processor by using a reusing policy and an operation forwarding policy.

Referring to FIGS. 1, 5, and 11, the operation processor 200 may store the module input feature map IFM_M in the internal memory 240 (S410). The operation processor 200 may perform the first operation OP22_1 included in the second branch B2 by using the module input feature map IFM_M stored in the internal memory 240 (S420). The operation processor 200 may store, in the internal memory 240, the first feature map FM1 generated as a result of performing the first operation OP22_1 (S430).

The operation processor 200 may perform the second operation OP22_2 by using the first feature map FM1 stored in the internal memory 240 (S440). The operation processor 200 may store, in the internal memory 240, the second feature map FM2 generated as a result of performing the second operation OP22_2 (S450).

In a like manner, the operation processor 200 may perform all operations (for example, the third operation OP22_3 and the fourth operation OP22_4) in the branch and may generate the second branch output feature map OFM_B2 as a result of performing the last operation (for example, the fourth operation OP22_4) among the operations in the branch (S460). The operation processor 200 may store the generated the second branch output feature map OFM_B2 in the internal memory 240 (S470) and may perform a subsequent module or operation (for example, the fourth operation OP4 of FIG. 4) by using the stored the second branch output feature map OFM_B2.

Herein, a policy of using the internal memory 240 such that, as in operations S430 to S460, the feature maps FM1 to FM3 generated as a result of the operations OP22_1 to OP22_4 are stored in the internal memory 240 and each of the feature maps FM1 to FM3 stored in the internal memory 240 is used as an input to each subsequent operation may be referred to as an operation forwarding policy.

The operation processor 200 according embodiments may use each of the feature maps FM1 to FM3, which are stored in the internal memory 240, as an input to each subsequent operation, based on the operation forwarding policy, thereby reducing the amounts of data input to and output from the external memory 300 and increasing the operation processing speed.

Although FIG. 11 illustrates embodiments in which the reusing policy and the operation forwarding policy are used together, this is an example, and in embodiments, the operation processor 200 may perform a neural network processing method using the internal memory 240 by using only the operation forwarding policy. That is, in one example, the operation processor 200 may generate the feature maps FM1 to FM3 by performing operations by using the module input feature map IFM_M stored in the external memory 300, may store the generated feature maps FM1 to FM3 in the internal memory 240, and may use each of the feature maps FM1 to FM3 stored in the internal memory 240 as an input to each subsequent operation.

Figure 12:
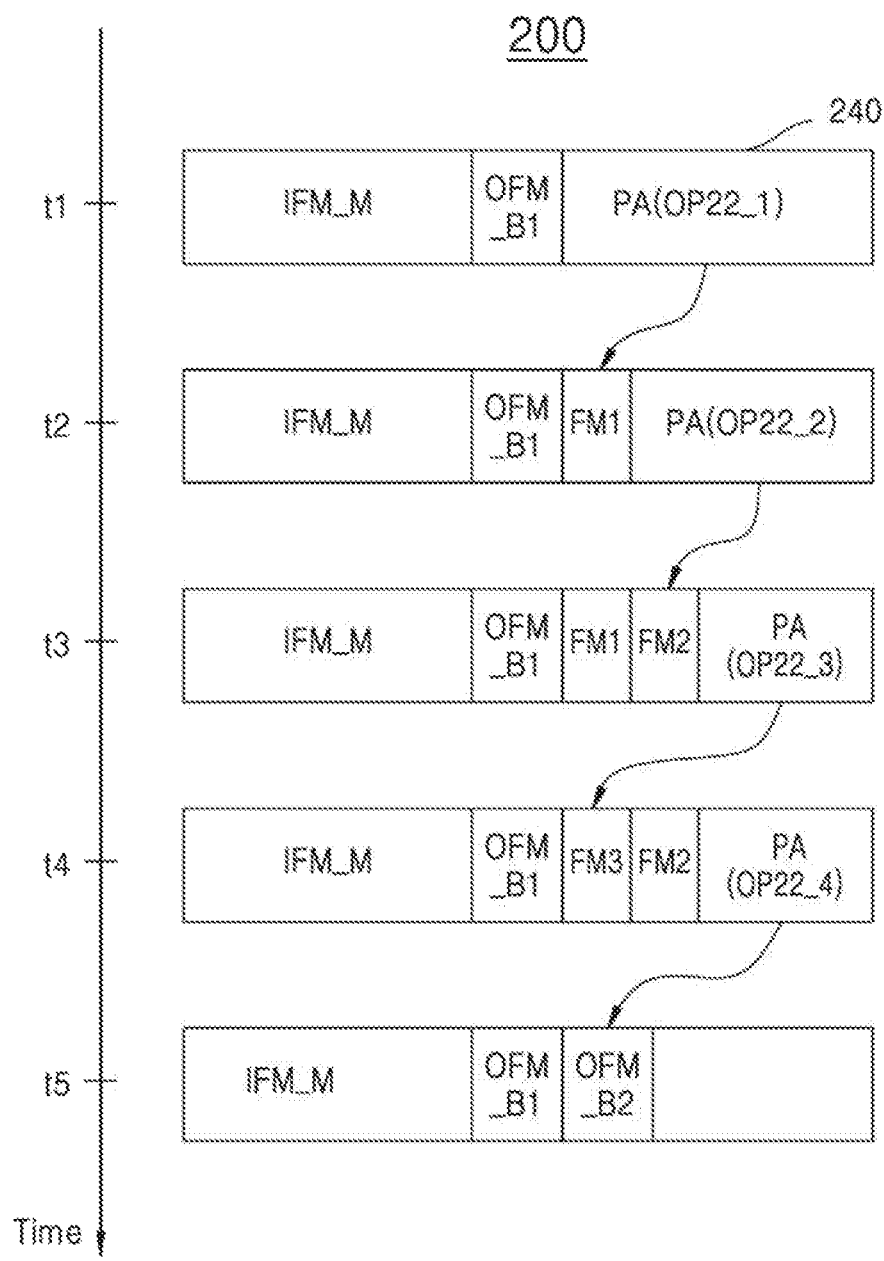
FIG. 12 is a diagram illustrating a neural network processing method according to a reusing policy and an operation forwarding policy, according to embodiments.

FIG. 12 is a diagram illustrating a neural network processing method according to a reusing policy and an operation forwarding policy, according to embodiments.

Referring to FIGS. 1, 5, and 12, at a first time point t1, the operation processor 200 may store the first branch output feature map OFM_B1, which is generated as a result of processing the module input feature map IFM_M and the first branch B1, in the internal memory 240 and may process the first operation OP22_1 by using the module input feature map IFM_M stored in the internal memory 240. During the processing of the first operation OP22_1, the operation processor 200 may process the first operation OP22_1 by using the processing area PA except for areas in which the module input feature map IFM_M and the first branch output feature map OFM_B1 are stored. The operation processor 200 may store, in the internal memory 240, the first feature map FM1 generated by processing operations included in the first operation OP22_1.

At a second time point t2, the operation processor 200 may process the second operation OP22_2 by using the first feature map FM1 stored in the internal memory 240 and may store, in the internal memory 240, the second feature map FM2 generated as a result thereof. During the processing of the second operation OP22_2, the operation processor 200 may process the second operation OP22_2 by using the remaining processing area PA except for areas in which the module input feature map IFM_M, the first branch output feature map OFM_B1, and the first feature map FM1 are stored.

At a third time point t3, the operation processor 200 may process the third operation OP22_3 by using the second feature map FM2 stored in the internal memory 240 and may store, in the internal memory 240, the third feature map FM3 generated as a result thereof. In embodiments, because the first feature map FM1 is no longer used to compute the operation processing graph OPG, the operation processor 200 may overwrite, with the third feature map FM3, an area of the internal memory 240, in which the first feature map FM1 is stored. During the processing of the third operation OP22_3, the operation processor 200 may process the third operation OP22_3 by using the remaining processing area PA except for areas in which the module input feature map IFM_M, the first branch output feature map OFM_B1, the first feature map FM1, and the second feature map FM2 are stored.

At a fourth time point t4, the operation processor 200 may process the fourth operation OP22_4 by using the third feature map FM3 stored in the internal memory 240 and may store, in the internal memory 240, the second branch output feature map OFM_B2 generated as a result thereof. In embodiments, because the second feature map FM2 and the third feature map FM3 are no longer used to compute the operation processing graph OPG, the operation processor 200 may overwrite, with the second branch output feature map OFM_B2, areas of the internal memory 240, in which the second feature map FM2 and the third feature map FM3 are stored. During the processing of the fourth operation OP22_4, the operation processor 200 may process the fourth operation OP22_4 by using the remaining processing area PA except for areas in which the module input feature map IFM_M, the first branch output feature map OFM_B1, the second feature map FM2, and the third feature map FM3 are stored.

Figure 13:
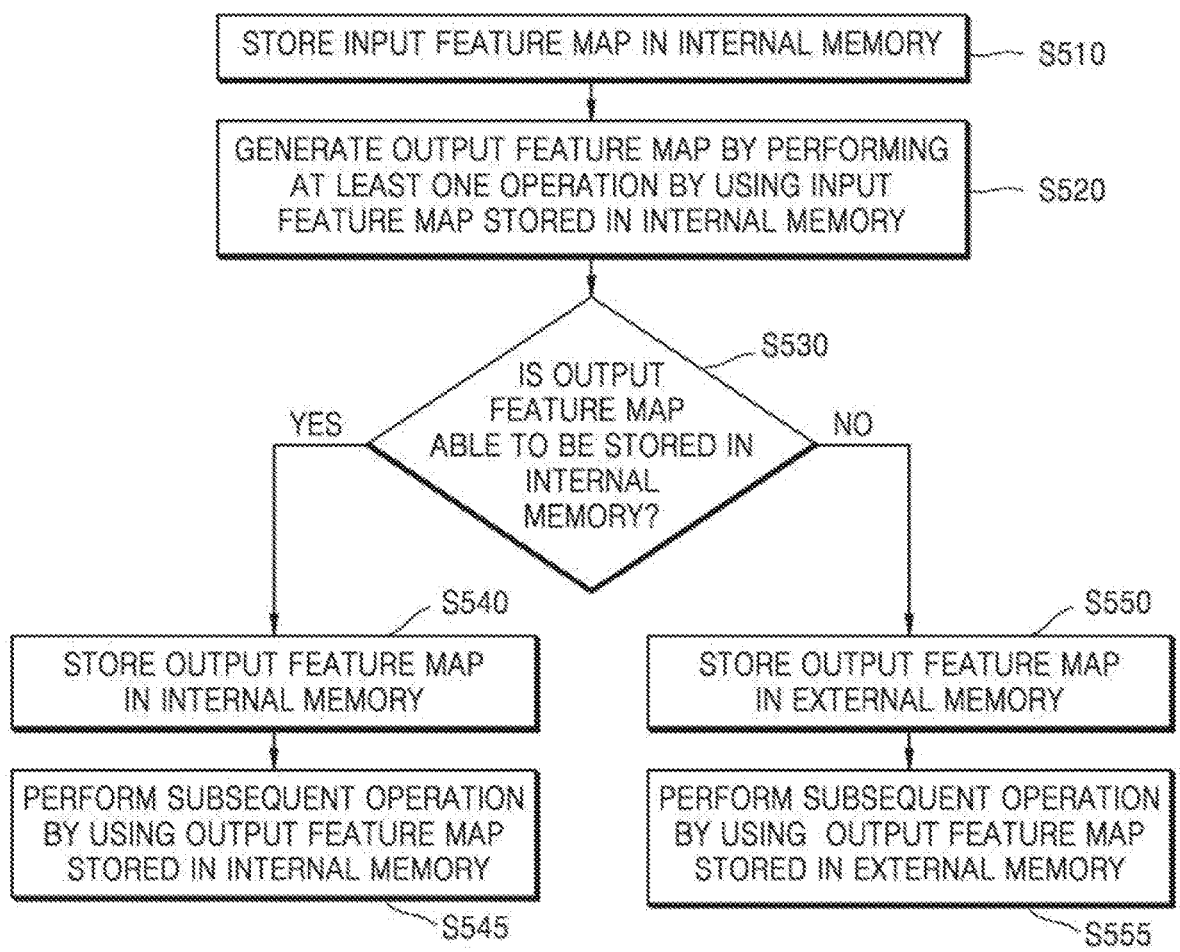
FIG. 13 is a flowchart illustrating a method of operating an operation processor, according to embodiments.

FIG. 13 is a flowchart illustrating a method of operating an operation processor, according to embodiments.

Referring to FIGS. 1 and 13, the operation processor 200 may store an input feature map in the internal memory 240 (S510) The operation processor 200 may generate an output feature map by performing at least one operation by using the input feature map stored in the internal memory 240 (S520). The operation processor 200 may determine whether the output feature map is able to be stored in the internal memory 240, based on an amount of data of the output feature map and an amount of free memory of the internal memory 240 (S530). Here, the amount of free memory may refer to an amount of data of the remaining memory area, except for other data (for example, a module input feature map and the like) that has already been stored in the internal memory 240, weights, and working memory used for operation processing.

When the output feature map is able to be stored in the internal memory 240, that is, when the amount of data of the output feature map is less than the amount of free memory of the internal memory 240, the operation processor 200 may store the output feature map in the internal memory 240 (S540). The operation processor 200 may perform a subsequent operation by using the output feature map stored in the internal memory 240 (S545).

When the output feature map is not able to be stored in the internal memory 240, that is, when the amount of data of the output feature map is greater than the amount of free memory of the internal memory 240, the operation processor 200 may store the output feature map in the external memory 300 (S550). The operation processor 200 may perform the subsequent operation by using the output feature map stored in the external memory 300 (S555).

Figure 14:
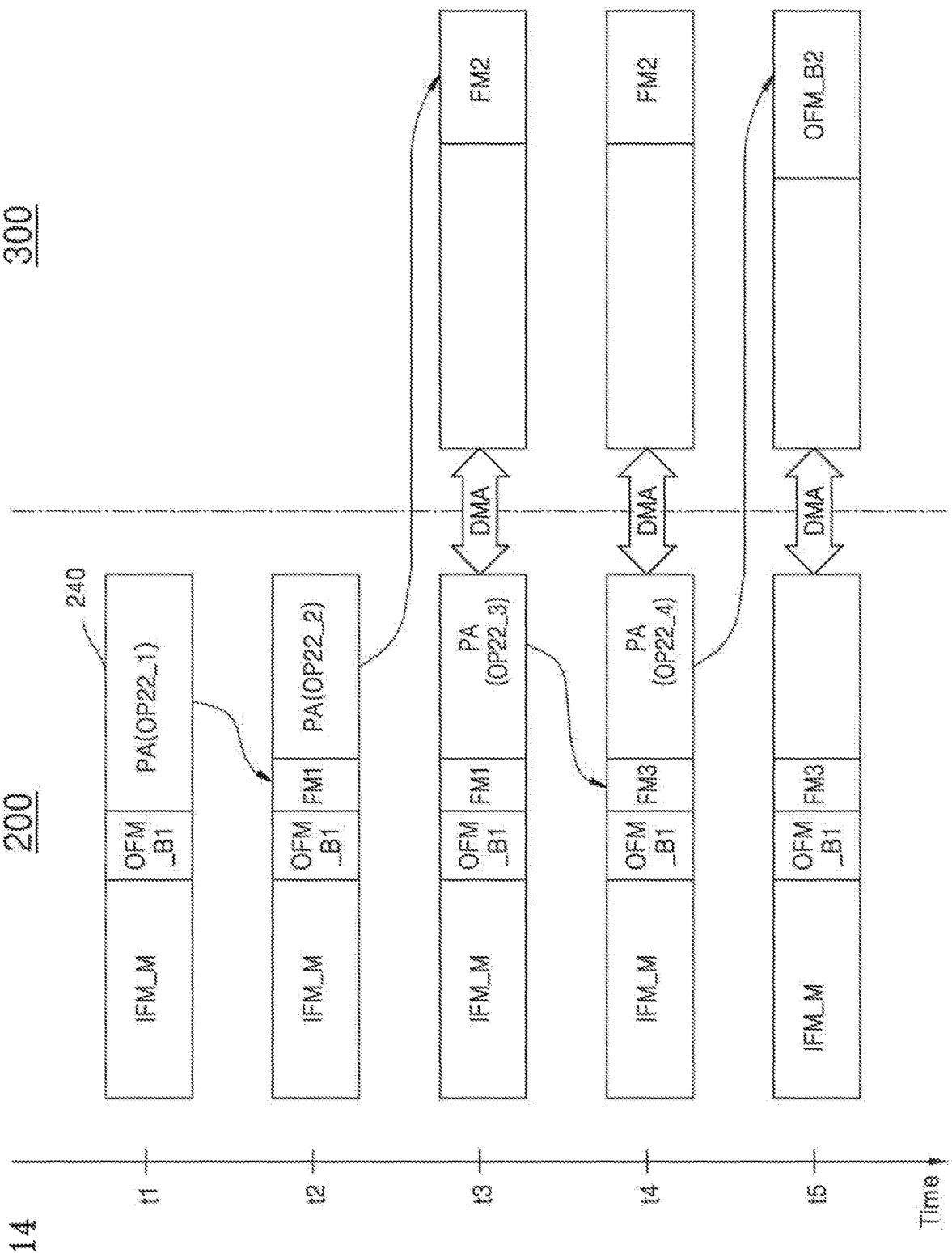
FIG. 14 is a diagram illustrating a neural network processing method according to embodiments.

FIG. 14 is a diagram illustrating a neural network processing method according to embodiments.

Referring to FIGS. 1, 5, and 14, at a first time point t1, the operation processor 200 may store, in the internal memory 240, the first branch output feature map OFM_B1 generated as a result of processing the module input feature map IFM_M and the first branch B1, and may process the first operation OP22_1 by using the module input feature map IFM_M stored in the internal memory 240. During the processing of the first operation OP22_1, the operation processor 200 may process the first operation OP22_1 by using the remaining processing area PA except for areas in which the module input feature map IFM_M and the first branch output feature map OFM_B1 are stored. The operation processor 200 may determine, based on an amount of data of the first feature map FM1 and an amount of free memory of the internal memory 240, that the first feature map FM1 generated as a result of the first operation OP22_1 is able to be stored in the internal memory 240, and the operation processor 200 may store the first feature map FM1 in the internal memory 240.

At a second time point t2, the operation processor 200 may process the second operation OP22_2 by using the first feature map FM1 stored in the internal memory 240 and may generate the second feature map FM2. The operation processor 200 may determine, based on an amount of data of the second feature map FM2 and the amount of free memory of the internal memory 240, that the second feature map FM2 generated as a result of the second operation OP22_2 is not able to be stored in the internal memory 240, and the operation processor 200 may store the second feature map FM2 in the external memory 300 through DMA.

At a third time point t3, the operation processor 200 may process the third operation OP22_3 by using the second feature map FM2 stored in the external memory 300 and may generate the third feature map FM3. The operation processor 200 may determine, based on an amount of data of the third feature map FM3 and the amount of free memory of the internal memory 240, that the third feature map FM3 generated as a result of the third operation OP22_3 is able to be stored in the internal memory 240, and the operation processor 200 may store the third feature map FM3 in the internal memory 240. In one example, the operation processor 200 may overwrite, with the third feature map FM3, an area in which the first feature map FM1 no longer used for a subsequent operation is stored.

At a fourth time point t4, the operation processor 200 may process the fourth operation OP22_4 by using the third feature map FM3 stored in the internal memory 240 and may generate the second branch output feature map OFM_B2. The operation processor 200 may determine, based on an amount of data of the second branch output feature map OFM_B2 and the amount of free memory of the internal memory 240, that the second branch output feature map OFM_B2 generated as a result of the fourth operation OP22_4 is not able to be stored in the internal memory 240, and the operation processor 200 may store the second branch output feature map OFM_B2 in the external memory 300 through DMA.

Figure 15:
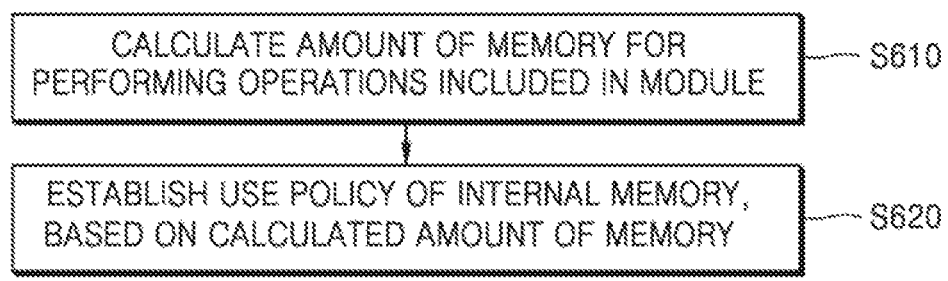
FIG. 15 is a flowchart illustrating a method of operating an operation processor, according to embodiments.

FIG. 15 is a flowchart illustrating a method of operating an operation processor, according to embodiments.

Referring to FIGS. 1 and 15, the memory manager 220 may calculate an amount of memory for performing operations included in a module (S610). The memory manager 220 may establish an internal memory use policy, based on the calculated amount of memory (S620).

In embodiments, when the calculated amount of memory is equal to or less than a first reference value, the memory manager 220 may process the operation processing graph OPG, based on a reusing policy. The memory manager 220 may use a module input feature map stored in the internal memory 240 in performing computation on a plurality of branches, based on the reusing policy.

In embodiments, when the calculated amount of memory is equal to or less than a second reference value, the memory manager 220 may process the operation processing graph OPG, based on a module forwarding policy. The memory manager 220 may use, as an input to a subsequent module or operation, a module output feature map stored in the internal memory 240, based on the module forwarding policy.

In embodiments, when the calculated amount of memory is equal to or less than a third reference value, the memory manager 220 may use, as an input to a subsequent operation, a feature map stored in the internal memory 240, based on an operation forwarding policy.

Figure 16:
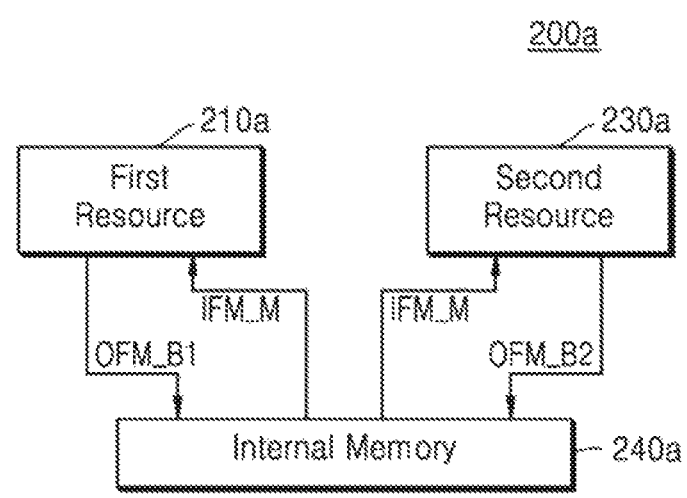
FIG. 16 is a block diagram illustrating an operation processor according to embodiments.

FIG. 16 is a block diagram illustrating an operation processor according to embodiments. FIG. 16 illustrates embodiments in which a plurality of resources perform neural network processing operations according to a reusing policy. Repeated descriptions given with reference to FIG. 1 will be omitted.

Referring to FIG. 16, an operation processor 200a may include a first resource 210a, a second resource 230a, and internal memory 240a. Each of the first resource 210a and the second resource 230a may include a neural network operation processing device such as a central processing unit (CPU), a graphics processing unit (GPU), an application processor (AP), a digital signal processor (DSP), a field-programmable gate array (FPGA), a neural network processing unit (NPU), an electronic control unit (ECU), or an image signal processor (ISP), and the first resource 210a and the second resource 230a may be respectively different resources.

The first resource 210a may receive the module input feature map IFM_M from the internal memory 240a and may generate the first branch output feature map OFM_B1 by performing at least one operation included in a first branch. The first resource 210a may store the generated first branch output feature map OFM_B1 in the internal memory 240a.

The second resource 230a may receive the module input feature map IFM_M from the internal memory 240a and may generate the second branch output feature map OFM_B2 by performing at least one operation included in a second branch. The second resource 230a may store the generated second branch output feature map OFM_B2 in the internal memory 240a.

According to embodiments, a plurality of resources, that is, first and second resources 210a and 230a, may share the internal memory 240a, may reuse the module input feature map IFM_M, and thus, may increase a neural network operation processing speed.

Figure 17:
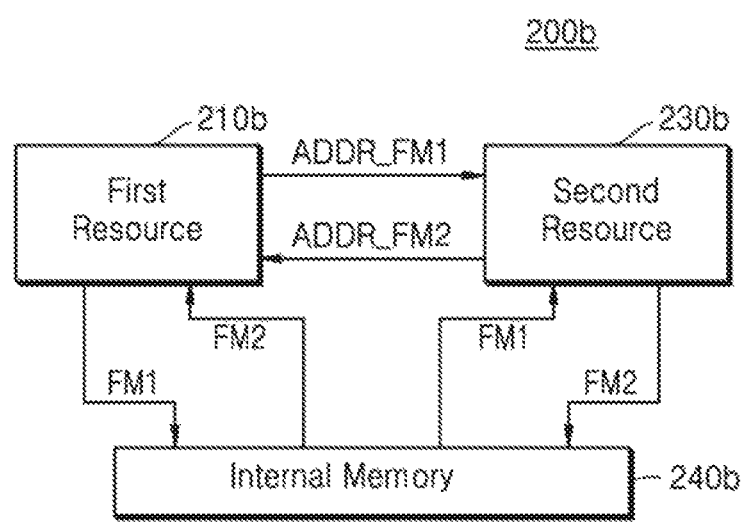
FIG. 17 is a block diagram illustrating an operation processor according to embodiments.

FIG. 17 is a block diagram illustrating an operation processor according to embodiments. FIG. 17 illustrates embodiments in which a plurality of resources perform neural network processing operations according to a module forwarding policy or an operation forwarding policy. Repeated descriptions given with reference to FIGS. 1 and 16 will be omitted.

Referring to FIG. 17, an operation processor 200b may include a first resource 210b, a second resource 230b, and internal memory 240b. The first resource 210b may perform a first operation based on an input feature map and may generate the first feature map FM1 as a result of the first operation. In embodiments, the first operation may be an operation efficiently performed by the first resource 210b. The first resource 210b may store the generated first feature map FM1 in the internal memory 240b. In addition, the first resource 210b may output a first feature map address ADDR_FM1 on the internal memory 240b to the second resource 230b.

The second resource 230b may receive the first feature map FM1 from the internal memory 240b based on the first feature map address ADDR_FM1, and may generate the second feature map FM2 by performing a second operation based on the first feature map FM1. In embodiments, the second operation may be an operation efficiently performed by the second resource 230b. The second resource 230b may store the generated second feature map FM2 in the internal memory 240b and may output a second feature map address ADDR_FM2 on the internal memory 240b to the first resource 210b.

The first resource 210b may receive the second feature map FM2 from the internal memory 240b based on the second feature map address ADDR_FM2, and may perform a subsequent operation based on the second feature map FM2.

According to embodiments, a plurality of resources, that is, first and second resources 210b and 230b, may share the internal memory 240b, may respectively forward feature maps, and thus, may increase a neural network operation processing speed.

FIG. 18 is a block diagram illustrating an electronic system according to embodiments.

Referring to FIG. 18, an electronic system 1000 may extract valid information by analyzing input data in real time based on a neural network and may determine a situation based on the extracted information or may control components of an electronic device in which the electronic system 1000 is mounted. For example, the electronic system 1000 may be applied to a robotic device such as a drone or an advanced drivers assistance system (ADAS), a smart TV, a smartphone, a medical device, a mobile device, an image display device, a measurement device, an IoT device, or the like, and in addition thereto, may be mounted in any one or any combination of various electronic devices.

The electronic system 1000 may include a processor 1010, RAM 1020, a neural network device 1030, memory 1040, a sensor 1050, and a transmitter/receiver (Tx/Rx) 1060. The components of the electronic system 1000 may be connected to each other in a communicable manner via a bus. The processor 1010 may control an overall operation of the electronic system 1000. For example, the processor 1010 may control a function of the neural network device 1030 by executing programs stored in the RAM 1020. In addition, the processor 1010 may output an input model, which is to undergo deep learning based on a neural network, to the neural network device 1030 by controlling the RAM 1020, the memory 1040, and the like. In embodiments, the processor 1010 may partition an operation processing graph into modules and may adjust the operation processing graph between a plurality of branches included in a module. The RAM 1020 may temporarily store programs, data, applications, or instructions.

The neural network device 1030 may include SRAM and may perform various operations used for neural network processing by using the SRAM. In one example, the neural network device 1030 may be implemented in software stored in system memory (for example, read-only memory (ROM)) and may be operated based on control by the processor 1010.

The memory 1040 is a storage place for storing data and may store, for example, various data generated during the process of performing operations by the neural network device 1030. The sensor 1050 may sense or receive a signal (for example, an image signal, an audio signal, a magnetic signal, a bio-signal, a touch signal, or the like) from outside the electronic system 1000 and may convert the signal into data. The Tx/Rx 1060 may include an operation resource for performing a large number of operations that are based on the neural network, or a communication resource implemented with various wired or wireless interfaces that may communicate with devices external to the electronic system 1000.

In embodiments, the neural network device 1030 may process an operation processing graph based on a reusing policy. The neural network device 1030 may use, based on the reusing policy, a module input feature map stored in the SRAM in performing computation on a plurality of branches.

In embodiments, the neural network device 1030 may process an operation processing graph based on a module forwarding policy. The neural network device 1030 may use, based on the module forwarding policy, a module output feature map stored in the SRAM, as an input to a subsequent module or operation.

In embodiments, the neural network device 1030 may use, based on an operation forwarding policy, a feature map stored in the SRAM, as an input to a subsequent operation.

The example embodiments described above may be written in programs executable on computers and may be implemented in general-purpose digital computers that run the programs by using computer-readable recording media. In addition, data structures used in the example embodiments described above may be recorded in computer-readable recording media by various means. The computer-readable recording media may include storage media such as magnetic storage media (for example, ROM, floppy disks, hard disks, or the like) or optical reading media (for example, compact disc-ROM (CD-ROM), digital versatile disks (DVDs), or the like).

While the inventive concept has been shown and described with reference to the embodiments thereof, it will be understood that various changes in form and details may be made therein without departing from the spirit and scope of the following claims.

What is claimed is:

1. A neural network system for processing a neural network model comprising an operation processing graph that comprises a plurality of operations, the neural network system comprising:
an operation processor comprising an internal memory storing a first module input feature map; and
a post processor configured to partition the operation processing graph into a plurality of modules;
wherein the operation processor is configured to:
obtain a first branch output feature map by performing a first operation among the plurality of operations, based on the stored first module input feature map; and
obtain a second branch output feature map by performing a second operation among the plurality of operations after the first operation is performed, based on the stored first module input feature map,
wherein the internal memory maintains storage of the first module input feature map while the first operation is performed,
wherein each of the plurality of modules comprises a plurality of branches,
wherein each branch of the plurality of branches corresponds to a memory area size from among a plurality of memory area sizes for processing the plurality of branches, and wherein operations included in each branch are independent from operations included in other branches from among the plurality of branches, wherein the post processor is further configured to determine a processing order of the plurality of branches, and
wherein the processing order arranges the plurality of branches such that the plurality of memory area sizes increase sequentially or such that the plurality of memory area sizes decrease sequentially.

2. The neural network system of claim 1, wherein the plurality of branches are configured to receive one input feature map via one node.

3. The neural network system of claim 2, wherein the plurality of branches comprise a first branch comprising the first operation, and a second branch comprising the second operation, and
wherein the operation processor is further configured to:
obtain the first branch output feature map by performing the first operation comprised in the first branch, based on the stored first module input feature map; and
obtain the second branch output feature map by performing the second operation comprised in the second branch, based on the stored first module input feature map.

4. The neural network system of claim 2, further comprising an external memory connected to the operation processor through direct memory access (DMA),
wherein the plurality of modules comprises a first module and a second module,
wherein the operation processing graph comprises a skip connection operation connected between a first operation node comprised in the first module and a second operation node comprised in the second module, and
wherein the post processor is further configured to exclude the skip connection operation from the operation processing graph such that the skip connection operation is processed using the external memory.

5. The neural network system of claim 1, wherein the plurality of branches comprises a first branch that is processed using a first memory area, and a second branch that is processing using a second memory area larger than the first memory area, and
wherein the post processor is further configured to obtain the processing order of the plurality of branches such that the second branch is processed earlier than the first branch.

6. The neural network system of claim 1, wherein the operation processor is further configured to:
obtain a first module output feature map by performing a third operation comprised in a first module among the plurality of modules, based on the stored first module input feature map;
store the obtained first module output feature map in the internal memory; and
obtain a second module output feature map by performing a fourth operation comprised in a second module among the plurality of modules, based on the stored first module output feature map.

7. The neural network system of claim 1, wherein the operation processor is further configured to:
obtain a second feature map by performing a third operation among the plurality of operations, based on a first feature map;
store the obtained second feature map in the internal memory; and
obtain a third feature map by performing a fourth operation among the plurality of operations, based on the stored second feature map stored.

8. The neural network system of claim 1, wherein the plurality of branches share a first input node and a first output node,
wherein the plurality of branches comprise a last branch that is processed last among the plurality of branches, and
wherein the operation processor is further configured to:
obtain a third branch output feature map by performing a third operation comprised in the last branch, based on the stored first module input feature map; and
overwrite, with the obtained third branch output feature map, an area of the internal memory, in which the first module input feature map is stored.

9. The neural network system of claim 1, wherein the plurality of branches share a first input node and a first output node,
wherein each of the plurality of branches receives the first module input feature map,
wherein the plurality of branches comprises a first branch comprising the first operation, and a second branch comprising the second operation, and
wherein the operation processor is further configured to:
obtain the first branch output feature map by performing the first operation comprised in the first branch, using a first remaining area of the internal memory that excludes a first area of the internal memory, in which the first module input feature map is stored; and
store the obtained first branch output feature map in a second area of the internal memory;
obtain the second branch output feature map by performing the second operation comprised in the second branch, using a second remaining area of the internal memory that excludes the first area and the second area in which the first branch output feature map is stored; and
store the obtained second branch output feature map in a third area of the internal memory.

10. The neural network system of claim 1, further comprising dynamic random access memory (DRAM) connected to the operation processor through direct memory access (DMA),
wherein the internal memory comprises static random access memory (SRAM).

11. The neural network system of claim 1, wherein the plurality of branches comprises a first branch, a second branch, a third branch, and a fourth branch,
wherein a first memory area size for processing the first branch is larger than a second memory area size for processing the second branch,
wherein the second memory area size is larger than a third memory area size for processing the third branch,
wherein the third memory area size is larger than a fourth memory area size for processing the second branch,
wherein based on the memory area sizes increasing sequentially, the fourth branch is processed before the third branch, the third branch is processed before the second branch, and the second branch is processed before the first branch, and
wherein based on the memory area sizes decreasing sequentially, the first branch is processed before the second branch, the second branch is processed before the third branch, and the third branch is processed before the second branch.

12. A method of processing a neural network model comprising an operation processing graph that comprises a plurality of operations and is partitioned into a plurality of modules, using an operation processor comprising an internal memory, the method comprising:
  storing a first module input feature map in the internal memory;
  obtaining a first branch output feature map by performing a first operation among the plurality of operations, based on the stored first module input feature map;
  obtaining a second branch output feature map by performing a second operation among the plurality of operations, based on the stored first module input feature map; and
  maintaining storage of the first module input feature map in the internal memory, while the first operation is performed,
  wherein each of the plurality of modules comprises a plurality of branches,
  wherein each branch of the plurality of branches corresponds to a memory area size from among a plurality of memory area sizes for processing the plurality of branches, and wherein operations included in each branch are independent from operations included in other branches from among the plurality of branches,
  wherein the method further comprises determining a processing order of the plurality of branches, and
  wherein the processing order arranges the plurality of branches such that the plurality of memory area sizes increase sequentially or such that the plurality of memory area sizes decrease sequentially.

13. The method of claim 12, wherein the plurality of branches shares one input node and one output node.

14. The method of claim 12, wherein the plurality of branches comprise a first branch that is processed using a first memory area, and a second branch that is processed using a second memory area lager than the first memory area, and
  wherein the processing order of the plurality of branches is obtained such that the second branch is processed earlier than the first branch.

15. The method of claim 13, wherein the plurality of modules comprises a first module and a second module,
  wherein the operation processing graph comprises a skip connection operation connected between a first operation node comprised in the first module and a second operation node comprised in the second module,
  wherein the method further comprises excluding the skip connection operation from the operation processing graph, and
  wherein the partitioning of the operation processing graph comprises partitioning the operation processing graph, from which the skip connection operation is excluded, into the plurality of modules.

16. The method of claim 15, further comprising processing the skip connection operation via an external memory connected to the operation processor through direct memory access (DMA).

17. The method of claim 12, wherein the operation processing graph comprises a first module, and
  wherein the method further comprises:
    obtaining an amount of memory for performing first operations comprised in the first module, among the plurality of operations;
    comparing the obtained amount of memory with an amount of free memory of the internal memory; and
    establishing a use policy of the internal memory, based on the amount of memory being compared with the amount of free memory.

18. The method of claim 12, further comprising:
  obtaining an output feature map by performing at least one operation among the plurality of operations, based on an input feature map;
  identifying whether to store the obtained output feature map in the internal memory, based on an amount of data of the obtained output feature map and an amount of free memory of the internal memory;
  based on the output feature map being identified to be stored in the internal memory, storing the output feature map in the internal memory; and
  based on the output feature map being identified to be not stored in the internal memory, storing the output feature map in an external memory connected to the operation processor through direct memory access (DMA).

19. A neural network device for processing an operation processing graph comprising a plurality of operations, the neural network device comprising:
  an internal memory storing a first feature map; and
  at least one processor configured to implement at least one resource configured to:
    partition the operation processing graph into a plurality of modules;
    obtain a second feature map by performing a first operation among the plurality of operations, based on the stored first feature map;
    store the obtained second feature map in the internal memory; and
    obtain a third feature map by performing a second operation among the plurality of operations, based on the stored second feature map,
  wherein each of the plurality of modules comprises a plurality of branches,
  wherein each branch of the plurality of branches corresponds to a memory area size from among a plurality of memory area sizes for processing the plurality of branches, and wherein operations included in each branch are independent from operations included in other branches from among the plurality of branches,
  wherein the at least one processor is further configured to determine a processing order of the plurality of branches, and
  wherein the processing order arranges the plurality of branches such that the plurality of memory area sizes increase sequentially or such that the plurality of memory area sizes decrease sequentially.

* * * * *